US009600069B2

(12) United States Patent
Publicover et al.

(10) Patent No.: US 9,600,069 B2
(45) Date of Patent: Mar. 21, 2017

(54) SYSTEMS AND METHODS FOR DISCERNING EYE SIGNALS AND CONTINUOUS BIOMETRIC IDENTIFICATION

(71) Applicant: Eyefluence, Inc., Reno, NV (US)

(72) Inventors: Nelson George Publicover, Reno, NV (US); Lewis James Marggraff, Lafayette, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 14/708,241

(22) Filed: May 9, 2015

(65) Prior Publication Data

US 2015/0326570 A1 Nov. 12, 2015

Related U.S. Application Data

(60) Provisional application No. 61/991,435, filed on May 9, 2014, provisional application No. 62/023,940, filed on
(Continued)

(51) Int. Cl.
*G06F 21/00* (2013.01)
*G06F 3/01* (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ...... G06F 3/013; G06F 3/04817; G06F 3/012; G06F 3/0482; G06F 3/017; G06F 3/0304;
(Continued)

(56) References Cited

U.S. PATENT DOCUMENTS 3,798,599 A 3/1974 Kafafian
3,863,243 A 1/1975 Skolnick et al.
(Continued)

FOREIGN PATENT DOCUMENTS

| EP | 0 679 984 | 4/1995 |
|---|---|---|
| EP | 0 984 347 | 8/1998 |
| EP | 0989722 | 3/2000 |
| EP | 2679147 | 12/2013 |
| WO | 2006092022 | 9/2006 |
| WO | 2011006760 | 1/2011 |
| WO | 2014111924 | 7/2014 |

OTHER PUBLICATIONS

Matey, James R., et al. "Iris on the move: Acquisition of images for iris recognition in less constrained environments.", Retrieved from http://ieeexplore.ieee.org/stamp/stamp.jsp?arnumber=4052478 , Proceedings of the IEEE94.11 (2006): 1936-1947.*
(Continued)

*Primary Examiner* — Chau Le
*Assistant Examiner* — Muhammad Chaudhry

(57) ABSTRACT

Apparatus, systems, and methods are provided for substantially continuous biometric identification (CBID) of an individual using eye signals in real time. The apparatus is included within a wearable computing device with identification of the device wearer based on iris recognition within one or more cameras directed at one or both eyes, and/or other physiological, anatomical and/or behavioral measures. Verification of device user identity can be used to enable or disable the display of secure information. Identity verification can also be included within information that is transmitted from the device in order to determine appropriate security measures by remote processing units. The apparatus may be incorporated within wearable computing that performs other functions including vision correction, head-mounted display, viewing the surrounding environment using scene camera(s), recording audio data via a microphone, and/or other sensing equipment.

8 Claims, 9 Drawing Sheets

Related U.S. Application Data on Jul. 13, 2014, provisional application No. 62/027,774, filed on Jul. 22, 2014, provisional application No. 62/027,777, filed on Jul. 22, 2014, provisional application No. 62/038,984, filed on Aug. 19, 2014, provisional application No. 62/039,001, filed on Aug. 19, 2014, provisional application No. 62/046,072, filed on Sep. 4, 2014, provisional application No. 62/074,920, filed on Nov. 4, 2014, provisional application No. 62/074,927, filed on Nov. 4, 2014.

(51) Int. Cl.
| | |
|---|---|
| *H04N 5/232* | (2006.01) |
| *H04N 5/247* | (2006.01) |
| *G06K 9/00* | (2006.01) |
| *G06F 21/32* | (2013.01) |
| *H04L 29/06* | (2006.01) |
| *H04W 12/06* | (2009.01) |
| *G02B 27/01* | (2006.01) |
| *G06F 3/0481* | (2013.01) |
| *G06T 19/00* | (2011.01) |
| *G02B 27/00* | (2006.01) |
| *G06F 3/0482* | (2013.01) |
| *G06F 3/03* | (2006.01) |

(52) U.S. Cl.
CPC ......... *G02B 27/0172* (2013.01); *G06F 3/012* (2013.01); *G06F 3/017* (2013.01); *G06F 3/0304* (2013.01); *G06F 3/0482* (2013.01); *G06F 3/04817* (2013.01); *G06F 21/32* (2013.01); *G06K 9/00617* (2013.01); *G06T 19/006* (2013.01); *H04L 63/0861* (2013.01); *H04N 5/23229* (2013.01); *H04N 5/247* (2013.01); *H04W 12/06* (2013.01); *G02B 2027/014* (2013.01); *G02B 2027/0138* (2013.01); *G02B 2027/0178* (2013.01); *G06F 2203/011* (2013.01)

(58) Field of Classification Search
CPC ............... G06F 21/32; G06F 2203/011; H04N 5/23229; H04N 5/247; G06K 9/00617; H04L 63/0861; H04W 12/06; G02B 27/017; G02B 27/0093; G02B 27/0172; G02B 2027/0178; G02B 2027/0138; G02B 2027/014; G06T 19/006
See application file for complete search history.

(56) References Cited

U.S. PATENT DOCUMENTS

| | | | |
|---|---|---|---|
| 4,359,724 | A | 11/1982 | Zimmerman et al. |
| 4,815,839 | A | 3/1989 | Waldorf |
| 4,850,691 | A | 7/1989 | Gardner et al. |
| 4,953,111 | A | 8/1990 | Yamamoto et al. |
| 5,214,456 | A | 5/1993 | Gersten |
| 5,345,281 | A | 9/1994 | Taboada et al. |
| 5,402,109 | A | 3/1995 | Mannik |
| 5,469,143 | A | 11/1995 | Cooper |
| 5,481,622 | A | 1/1996 | Gerhardt et al. |
| 5,517,021 | A | 5/1996 | Kaufman et al. |
| 5,566,067 | A | 10/1996 | Hobson et al. |
| 5,570,698 | A | 11/1996 | Liang et al. |
| 5,682,144 | A | 10/1997 | Mannik |
| 5,689,241 | A | 11/1997 | Clarke, Sr. et al. |
| 5,748,113 | A | 5/1998 | Torch |
| 5,844,544 | A | 12/1998 | Kahn et al. |
| 5,867,587 | A | 2/1999 | Aboutalib et al. |
| 5,886,683 | A | 3/1999 | Tognazzini |
| 5,912,721 | A | 6/1999 | Yamaguchi et al. |
| 6,003,991 | A | 12/1999 | Viirre |
| 6,087,941 | A | 7/2000 | Ferraz |
| 6,097,295 | A | 8/2000 | Griesinger et al. |
| 6,102,870 | A | 8/2000 | Edwards |
| 6,163,281 | A | 12/2000 | Torch |
| 6,204,828 | B1 | 3/2001 | Amir et al. |
| 6,243,076 | B1 | 6/2001 | Hatfield |
| 6,246,344 | B1 | 6/2001 | Torch |
| 6,260,968 | B1 | 7/2001 | Stark et al. |
| 6,323,884 | B1 | 11/2001 | Bird et al. |
| 6,334,683 | B2 | 1/2002 | Apple et al. |
| 6,346,929 | B1 | 2/2002 | Fukushima et al. |
| 6,456,262 | B1 | 9/2002 | Bell |
| 6,526,159 | B1 | 2/2003 | Nickerson |
| 6,542,081 | B2 | 4/2003 | Torch |
| 6,577,329 | B1 | 6/2003 | Flickner et al. |
| 6,608,615 | B1 | 8/2003 | Martins |
| 6,867,752 | B1 | 3/2005 | Yamazaki et al. |
| 6,919,907 | B2 | 7/2005 | Berstis |
| 7,029,121 | B2 | 4/2006 | Edwards |
| 7,071,831 | B2 | 7/2006 | Johns |
| 7,245,273 | B2 | 7/2007 | Eberl et al. |
| 7,365,738 | B2 | 4/2008 | Molander et al. |
| 7,429,108 | B2 | 9/2008 | Rosenberg |
| 7,515,054 | B2 | 4/2009 | Torch |
| 7,561,143 | B1 | 7/2009 | Milekic |
| 7,760,910 | B2 | 7/2010 | Johnson et al. |
| 7,850,306 | B2 | 12/2010 | Uusitalo et al. |
| 7,881,493 | B1 | 2/2011 | Edwards et al. |
| 8,120,577 | B2 | 2/2012 | Bouvin et al. |
| 8,185,845 | B2 | 5/2012 | Bjorklund et al. |
| 8,311,267 | B2 | 11/2012 | Miyake et al. |
| 8,339,446 | B2 | 12/2012 | Blixt et al. |
| 8,382,285 | B2 | 2/2013 | Eberl et al. |
| 8,462,949 | B2 | 6/2013 | Anderson et al. |
| 8,564,533 | B2 | 10/2013 | Yuan |
| 8,593,375 | B2 | 11/2013 | Maltz |
| 8,643,680 | B2 | 2/2014 | Baldwin et al. |
| 2001/0028309 | A1 | 10/2001 | Torch |
| 2003/0038754 | A1 | 2/2003 | Goldstein et al. |
| 2004/0061680 | A1 | 4/2004 | Taboada |
| 2005/0007552 | A1 | 1/2005 | Fergason et al. |
| 2005/0047629 | A1 | 3/2005 | Farrell et al. |
| 2005/0243054 | A1 | 11/2005 | Beymer et al. |
| 2011/0175932 | A1 | 7/2011 | Yu et al. |
| 2011/0211056 | A1 | 9/2011 | Publicover et al. |
| 2012/0105486 | A1 | 5/2012 | Lankford et al. |
| 2012/0272179 | A1 | 10/2012 | Stafford |
| 2012/0275664 | A1 | 11/2012 | Bergen |
| 2012/0293773 | A1 | 11/2012 | Publicover et al. |
| 2012/0294478 | A1 | 11/2012 | Publicover et al. |
| 2013/0114850 | A1 | 5/2013 | Publicover et al. |
| 2013/0135196 | A1 | 5/2013 | Park et al. |
| 2013/0176533 | A1 | 7/2013 | Raffle et al. |
| 2013/0215275 | A1* | 8/2013 | Berini ..................... G06F 21/32 348/150 |
| 2014/0002352 | A1 | 1/2014 | Jacob et al. |
| 2014/0062853 | A1 | 3/2014 | Chaudhri et al. |
| 2014/0092006 | A1 | 4/2014 | Boelter et al. |
| 2014/0161325 | A1* | 6/2014 | Bergen ............... G06K 9/00617 382/117 |
| 2014/0184775 | A1 | 7/2014 | Drake et al. |
| 2014/0204029 | A1 | 7/2014 | Lopez et al. |
| 2014/0232638 | A1 | 8/2014 | Choi et al. |
| 2014/0240220 | A1 | 8/2014 | Yoon et al. |
| 2014/0247210 | A1 | 9/2014 | Henderek et al. |
| 2015/0220157 | A1 | 8/2015 | Marggraff et al. |

OTHER PUBLICATIONS

Jain, Anil K., et al. "An introduction to biometric recognition.", Retrieved from http://ieeexplore.ieee.org/stamp/stamp.jsp?arnumber=1262027, IEEE Transactions on circuits and systems for video technology 14.1 (2004): 4-20.*

Form PCT/ISA/210; International Search Report from the Korean Intellectual Property Office for PCT/US2015/030052; Dated Feb. 25, 2016; 3 pages.

(56) References Cited

OTHER PUBLICATIONS

Form PCT/ISA/237; International Searching Authority—Written Opinion from the Korean Intellectual Property Office for PCT/US2015/030052; Dated Feb. 25, 2016; 17 pages.

* cited by examiner

SYSTEMS AND METHODS FOR DISCERNING EYE SIGNALS AND CONTINUOUS BIOMETRIC IDENTIFICATION

RELATED APPLICATION DATA

The present application claims benefit of provisional application Ser. Nos. 61/991,435, filed May 9, 2014, 62/023,940, filed Jul. 13, 2014, 62/027,774, filed Jul. 22, 2014, 62/027,777, filed Jul. 22, 2014, 62/038,984, filed Aug. 19, 2014, 62/039,001, filed Aug. 19, 2014, 62/046,072, filed Sep. 4, 2014, 62/074,920, filed Nov. 4, 2014, and 62/074,927, filed Nov. 4, 2014, the entire disclosures of which are expressly incorporated by reference herein.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

The present invention relates generally to systems and methods for substantially continuous biometric identification ("CBID"), eye-tracking, and eye-signal control by an individual in real time. CBID utilizes techniques within the fields of biometric-based identification, encryption, and cyber security; and is implemented within unobtrusive processor(s) that can be associated with a head-mounted display, remote displays, eye-tracking camera(s), scene camera(s) that view the device wearer's environment, and/or other wearable sensors. CBID may address security issues associated with attempts to deliberately misrepresent a device user's identity and/or unintended identity theft using the steps of iris code determination, identifying other biometric features, and secure interfaces with network devices within a system of systems ("SoS") architecture.

BACKGROUND

The wide-spread use of the internet and computing/communications devices has led to an explosive growth in the electronic dissemination of information. However, verifiable control over the recipient(s) of secure information remains an important issue in the field of cyber security. Moreover, recipients of information can also become sources of sensitive information where real time knowledge of the identity of such a source can be an important security issue.

An example of this situation is knowledge of the identity of an individual entering credit card (or other account) information during the process of making an online purchase. Present-day techniques commonly used to remotely identify the recipients or sources of secure information are readily susceptible to deception. In the United States, identity theft affects approximately fifteen million individuals each year with an estimated financial impact of $50 billion.

A computer or telecommunications device receiving information from the internet is commonly identified by a so-called IP (i.e., internet protocol) address and/or identification codes typically embedded within central processing units (CPUs) or firmware. Although the IP address and/or embedded device identification can be used to identify the apparatus receiving or sending information, the IP address does not verifiably identify the user(s) of the device.

Schemes that attempt to relate a device with an individual user commonly employ passwords, security questions, and/or historical records (referred to by terms such as "trackers" or "cookies"). However, these schemes can easily be circumvented once a user has, for example, "logged in." This can become a particularly critical issue when a device is lost or stolen, or if access to the device is gained by someone other than the intended recipient of information. Furthermore, schemes exist to mask or hide the true identity and/or location of a particular machine's IP and/or hardware embedded address.

The most common cyber security methods that attempt to verify the identity of a user employ passwords and/or security questions. Once passwords have been entered and/or security questions answered, it is possible to switch users; defeating the role of the security scheme. Furthermore, there are a large number of methods employed to surreptitiously acquire passwords and/or answers to security questions. These include intercepting keystrokes during password entry; "guessing" passwords based on factors such as family names, locations, pets, or simple alphanumeric sequences; deciphering information embedded in packets as they are transmitted throughout the internet (where public, wireless transmission is a particularly vulnerable access point); automated sequencing through series of commonly used passwords; acquiring passwords via embedded malware; posing as legitimate websites that require password entry; and other forms of so-called "phishing."

Biometric schemes for user identification are becoming increasingly commonplace as a machine-based method to uniquely identify an individual. Biometric identification involves the sensing of physical, genetic, physiological, and/or behavioral attributes that are unique to an individual. Substantially continuous, real-time biometric identification demands a technique that is rapid, non-intrusive, and non-invasive.

As an example of a biometric identification technique, U.S. Pat. No. 8,432,252 describes a device that optically scans a finger to identify an individual and subsequently enables or disrupts secure communications based on recognition of the finger print. A number of patents that make use of identification techniques based on finger scans have been issued to the assignee of U.S. Pat. No. 8,432,252. Automated face recognition, voice recognition, and signature recognition are the basis for other biometric authentication methods. However, these techniques generally do not provide substantially continuous user identification in an unobtrusive manner and are susceptible to relatively simple methods to defeat security features.

For example, in most cases, such biometric devices can positively identify an individual at the time of a scan. However, it is subsequently possible to have a separate individual receive, or be the source of, secure information. Even at the time of a scan, devices used to display and/or enter secure information are generally not directly coupled to those for user identification. For example, automated face recognition can be occurring while a separate individual is performing keyboard entries. These relatively simple methods to defeat a user's true identity are particularly an issue when there is potential benefit to an individual who has been identified biometrically to deliberately hide or transfer his or her identity.

An example of an instance in which the recipient of information may wish to deliberately disguise a true identity is the remote administration of online scholastic examinations. In this case, it is possible for the ultimate recipient of an examination grade to address all security challenges while a separate individual addresses actual examination questions. Sophisticated identity swapping schemes are routinely reported during administration of GRE (Graduate Record Examination), GMAT (Graduate Management Admissions Test), LSAT (Law School Admissions Test), MCAT (Medical College Admissions Test), and other professional career advancement examinations. Security issues associated with remote administration of scholastic and other forms of examination are predicted to become increasingly important as education and other information-based service providers move toward an increasing use of MOOC (massive open online course), distance-learning, and assessment formats.

Iris recognition is currently regarded as being one of the most secure biometric identification techniques. The iris displays a fine structure that is an epigenetic phenotypic feature, developing with random components during embryonic gestation. Thus, unlike DNA fingerprinting, even genetically identical twins (comprising approximately 1% of the population) have completely unique iris pigments and structures. Further proof of the epigenetic nature of the iris is the fact that, although the left and right (genetically identical) eyes of an individual possess a similar structure and color, textural details of an individual's left and right eyes are highly distinctive.

Even though an iris can be viewed non-invasively, it is within a well-protected organ (i.e., the eye) that, unlike fingerprints, is generally protected from damage and wear. Although there are a few medical procedures that can change the fine structure and pigment within the eye, iris texture generally remains remarkably stable (unlike, for example, facial features) over periods of decades.

John Daugman originally developed iris recognition algorithms while he was at the University of Cambridge. Most commercially deployed iris-recognition systems in use today utilize Daugman's algorithms (e.g., as disclosed in U.S. Pat. No. 5,291,560). Commercially available iris recognition systems (e.g., Iris ID Systems Inc., BI2 Technologies, IrisGuard Inc., Eyelock Corp.) generally use hand-held or pedestal-mounted devices, and operate at distances between an iris and a camera from 10 centimeters up to a few meters.

Daugman developed and applied two-dimensional Gabor wavelet (i.e., a special case of short-sampled Fourier transform) coefficients based on iris images collected using real-time video conditions. By converting Cartesian-coordinate based images into polar coordinates and applying 2-D Gabor filters to small regions, a complex dot product can be computed that is primarily reflective of phase angle. The lack of sensitivity to overall light amplitude (i.e., image brightness, contrast, etc.) helps to discount variations in video recording conditions.

The most significant bits of the dot products from different regions are assembled into a so-called code of the iris or herein after "irisCode." The original and most commonly implemented irisCode utilizes 2 bits from each region to generate a 2048-bit (i.e., 256-byte) value that can identify a unique individual from among millions. Algorithms to compute irisCodes have been coded as both software within CPU-based devices and hardware-embedded firmware.

Today, there are more than sixty million individuals in 170 nations registered for identification based on iris patterns. The government of India is currently recording iris scans and finger prints of its entire population of more than a billion individuals. Companies and government agencies that utilize these technologies include IBM, Panasonic, LG, Sarnoff, London Heathrow Airport (as well as Birmingham, Gatwick and Manchester), IrisAccess (Korea), IrisPass (Japan), CanPass (Canadian Nexus system), the Afghan repatriation program, and the United States Department of Defense detainee population management program.

The iris has a well-defined geometry that changes only as a result of the contraction of two opposing muscles (sphincter papillae and dilator papillae) that control the diameter of the pupil. It is this uniformity and stability that has led to an unprecedented false match rate as low as (depending on stringency selection) 1 in $10^{9.6}$ (i.e., about one in four billion) with typical image quality, and including provisions for head tilt and movement.

SUMMARY

Although the best understanding of the present invention will be had from a thorough reading of the specification and claims presented below, this summary is provided in order to acquaint the reader with some of the new and useful features of the systems and methods herein. Of course, this summary is not intended to be a complete litany of all of the features of the systems and methods herein, nor is it intended in any way to limit the breadth of the claims, which are presented at the end of the detailed description of this application.

In accordance with one embodiment, apparatus, systems, and methods are provided for a head mounted device that include at least one processor connected to at least one imager, where one of the imagers is oriented toward the eye of a user, the processor is configured to at least one of substantially continuously, simultaneously, and/or periodically determine eye gaze estimation, or where the imager detects one or more distinctive features of the eye; and determine biometric data of a user including facial features, voice or iris data of a user, where the biometric data is used for the identification and authentication of the user for access and control of at least the head mounted device, a connected device, a wireless device and a remote server.

In accordance with another embodiment, apparatus, systems, and methods are provided for substantially continuous biometric identification (CBID) of a device user. The apparatus may be substantially unobtrusively mounted on headwear that can be embedded within, or attached to, common eyeglass frames or within so-called wearable computing devices such as those known as Google Glass® (Google Inc.). More specifically, an exemplary embodiment may include one or more illumination sources that (if desired) can illuminate one or both irises of the device wearer, one or more micro-cameras oriented to view one or both eyes of the device wearer directly, through a light-passing mechanism, or via a reflection system, and a processing unit that may 1) analyze images of the eye to determine the identity of the device wearer; and/or 2) transmit images of the eye to another processing unit that, in turn, determines the identity of the device wearer.

In this disclosure, voluntary eye movements that are intended to interact with a computing device are referred to as "eye signals." Eye signal controls are described in Systems and Methods for Biomechanically-based Eye Signals for Interacting with Real and Virtual Objects, application Ser. No. 14/708,234, filed May 9, 2015, the entire disclosure of which is expressly incorporated by reference herein.

In addition, both biometric identification information (e.g., irisCodes) and all information that is associated with CBID must be transmitted securely, where communication steps may include wireless communications with a headset device. CBID-based communications are performed securely in manners described in Systems and Methods for Using Eye Signals with Secure Mobile Communications, application Ser. No. 14/708,229, filed May 9, 2015, the entire disclosure of which is expressly incorporated by reference herein.

In accordance with a first embodiment, apparatus, systems, and methods are provided that may substantially continuously, periodically, and/or on demand perform iris recognition utilizing a wearable device.

In accordance with another embodiment, apparatus, systems, and methods are provided that may establish a true identity of a user wearing the head mounted device.

In accordance with another embodiment, apparatus, systems, and methods are provided that may establish a true identity of a user via behavioral biometrics.

In accordance with another embodiment, apparatus, systems, and methods are provided that provide a user easy, simple, and/or intuitive methods and systems for security without the need of a token, where a token comprises at least one of a password and a physical device, where a physical device comprises a credit card, key fob, or other physical token.

In accordance with another embodiment, apparatus, systems, and methods are provided that allows eye signals to be performed only when there is verified biometric identification of the device wearer.

In accordance with another embodiment, apparatus, systems, and methods are provided that may prevent user identity fraud and identity theft.

In accordance with another embodiment, apparatus, systems, and methods are provided that use filters that establish multiple levels of device security for at least one of a single user, multiple users, and unlimited access by all users of the wearable device.

In accordance with another embodiment, apparatus, systems, and methods are provided that use the head mounted device to authenticate users for at least one of educational, legal, licensing, and delivery of services purposes.

In accordance with another embodiment, apparatus, systems, and methods are provided that use the head mounted device to authenticate users for permitting access to at least one of a secure room, restricted area, automobile, airplane, and marine vessel.

In accordance with another embodiment, apparatus, systems, and methods are provided wherein images of both real and virtual objects viewed and perceived by a device wearer can be stored or tagged for future reference as a form of personal augmented memory (PAM).

In accordance another embodiment, apparatus, systems, and methods are provided that use the head mounted device to verifiably annotate the source of documents or data.

In accordance with another embodiment, apparatus, systems, and methods are provided that use the head mounted device to verifiably annotate that documents or data have been inspected or handled by an identified individual.

In accordance with another embodiment, apparatus, systems, and methods are provided that use the head mounted device to verifiably annotate that a real or virtual object has been inspected or handled by an identified individual.

In accordance, with another embodiment, apparatus, systems, and methods are provided that use the head mounted device to verifiably annotate that writing, a signature, or other handwritten information has been generated, modified, or reviewed by an identified individual.

In accordance with another embodiment, apparatus, systems, and methods are provided that use the head mounted device to verifiably annotate that an identified individual has spoken or heard aural information.

In accordance with another embodiment, apparatus, systems, and methods are provided that use the head mounted device to verifiably annotate that an identified individual has performed an activity that comprises gaze upon an object and some physical action discernible by the head-mounted device.

In accordance with another embodiment, apparatus, systems, and methods are provided that use the head mounted device for the purpose of verifiably monitoring, limiting, controlling, or impacting the activities, behavior, performance, or biometrics of an identified individual who has been incarcerated, placed on parole, placed on probation, subject to a restraining order, or otherwise is subject to behavior imposed by a court of law.

In accordance with another embodiment, apparatus, systems, and methods are provided that use the head mounted device for the purpose of verifiably assessing the performance or state of intoxication of an individual suspected of being under the influence of alcohol, drugs, or other substance at a point in time or over a period of time.

In accordance with another embodiment, apparatus, systems, and methods are provided that use the head mounted device to verifiably annotate the biometric response or other metrics of an identified individual engaged in supervised medical activity for testing, treatment or research of a drug or other prescription.

In accordance with another embodiment, apparatus, systems, and methods are provided that use the head mounted device for the purpose of authenticating a purchase, where the authenticated purchase is for on-line purchase security and off-line purchase security, where off-line includes at a retail establishment or any location where an object is desired to be purchased.

In accordance with another embodiment, apparatus, systems, and methods are provided that use the head mounted device to permit viewing of data by an identified individual and no other individual.

In accordance with another embodiment apparatus, systems, and methods are provided that use the head mounted device that includes a second imager connected to the processor oriented outward, where the second imager detects a code that can be de-coded by the processor, where the code is one of a bar code and a QR code and where the processor de-coded data represents information about a product.

In accordance with another embodiment, apparatus, systems, and methods are provided that use the head mounted device that includes a second imager connected to the processor oriented outward, where the second imager detects an object that can be identified by the processor using image recognition, and where the processor represents information about a product.

In accordance with another embodiment apparatus, systems, and methods are provided that use the information related to a product to allow an authenticated user to securely purchase the product.

In accordance with another embodiment, apparatus, systems, and methods are provided wherein information in the region of a monitor that is actually being viewed by an identified device wearer can (in real time) be displayed with high spatial resolution and/or updated at high temporal frequencies while the surrounding regions (i.e., not being viewed by the device wearer) are displayed at a lower spatial resolution and/or are updated at lower frequencies.

In accordance with another embodiment, apparatus, systems, and methods are provided wherein, when information in the region of a monitor that is actually being viewed by an identified device wearer (in real time) is displayed with higher spatial resolution and/or updated at higher temporal frequencies than the surrounding regions (i.e., not being viewed by the device wearer) that are displayed at a lower spatial resolution and/or are updated at lower frequencies, that a specified region or regions, or a specified object or objects, within the lower spatial resolution areas, may be displayed at a higher spatial resolution and/or are updated at higher frequencies than the lower spatial resolution areas. For example, facial features, such as eyes, may be presented in higher resolution when rendered outside a foveal area during high-resolution foveated rendering.

In accordance with another embodiment, apparatus, systems, and methods are provided that allow an entity to initiate a secure communication channel with another entity by mutual gaze where the security of the communication channel may be established prior to communication and may be revalidated continuously or at intervals during communication.

In accordance with another embodiment, apparatus, systems, and methods are provided that enable a secure protocol for coordination among parties to cause an action to occur whereupon each party performs some action during which time their identities are continuously verified with CBID.

In accordance with another embodiment, systems and methods are provided that alert an individual about the desire by one or more identified individuals to exchange selected information based on mutual gaze.

In accordance with another embodiment, apparatus, systems, and methods are provided that enable a secure means of maintaining the privacy of gaze data temporally coupled with scene camera data and/or audio data.

Aspects and applications of the systems and methods presented here are described below in the drawings and detailed description of the exemplary embodiments. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define terms or features herein. To the contrary, if the provisions of 35 U.S.C. §112, ¶ 6 are sought to be invoked to define features of the claims, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed features, it is intended that the features not be limited only to the specific structure, material, or acts that are described in the exemplary embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which:

FIG. 9B illustrates the placement of a sight shield that prohibits anyone other than the device wearer from viewing the contents of the display.

DETAILED DESCRIPTION

Figure 1:
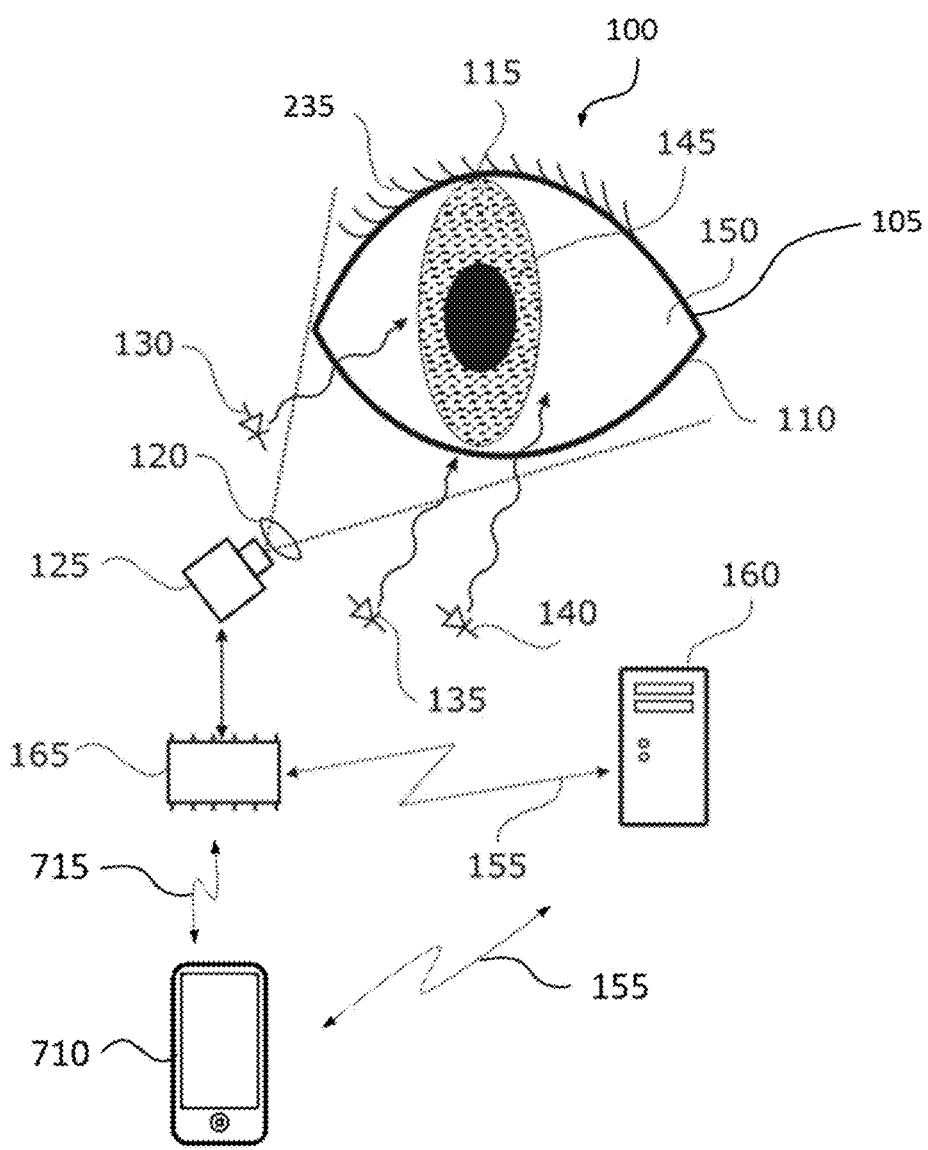
FIG. 1 is a schematic of the foundational elements of an exemplary embodiment of a system for identifying a wearer of a device.

In the following description, and for the purposes of explanation, numerous specific details are set forth in order to provide a thorough understanding of the various aspects of the exemplary embodiments. It will be understood, however, by those skilled in the relevant arts, that the apparatus, systems, and methods herein may be practiced without these specific details. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments.

Iris Recognition System

Most current iris recognition systems operate at distances between an iris and a camera in the range of ten to twenty centimeters (with research efforts targeting distances as great as three to ten meters). The systems herein may perform iris recognition substantially continuously over the relatively short distances of about twenty to thirty millimeters (20-30 mm) associated with unobtrusive headwear.

Over such short distances, general image resolution can be equivalent to, or even exceed, image quality recorded over distances used by present-day commercial iris-recognition devices provided there is adequate illumination. However, spatial aberrations including substantial skew may be generated by the micro-lens and/or other optics attached to iris-tracking micro-cameras. Spatial aberrations can distort images of the iris and other structures in the region of the eye.

Spatial aberrations can be accounted for within iris recognition algorithms by using the short focal distance platform to compute both "target" (i.e., confirmed as belonging to an intended recipient) and device-user authentication irisCodes. This maintains a degree of consistency among irisCodes as they are compared.

Iris identification is also dependent on the ability to obtain approximately on-axis images of the iris (i.e., viewed perpendicular to the surface of the eye and centered about the iris and/or pupil). When viewed at severe angles (i.e., off-axis), features of the iris can become distorted, resulting in loss of information. This is particularly an issue when placement of the camera is both unobtrusive and within headwear in close proximity to the eye. During normal movements of the eye, the iris can move off-axis relative to the viewing angle of an unobtrusive camera, resulting in a loss in the ability to generate irisCodes that can be compared with high-stringency to a target irisCode.

In exemplary embodiments to handle this situation, the system may use high-stringency iris recognition when the iris can be viewed in an on-axis mode coupled with less stringent iris recognition and/or feature recognition of other structures in the region of the eye when the iris is pointed off-axis relative to the direction viewed by a camera. Features tracked during off-axis periods are describe more fully below, but can include the shape of the sclera, patterns and locations of blood vessels within sclera, shapes of eyelids, and/or locations of eyelashes. Unlike the iris, these features may change during a lifetime. However, such features do not change significantly over the time course of a single session of wearing the device.

Thus, during normal operation, a user may look directly toward a camera to register a high-stringency irisCode upon initially wearing the device and at least periodically thereafter. Depending on the desired level of security, the precision and number of Gabor coefficients as well as the measure of distinction or Hamming distance (i.e., a measure of the difference between two vectors of 0s and 1s that are of equal length) can be adjusted to a wide range of stringencies. At times between registrations using high-stringency irisCodes, features in and around the region of the eye are tracked to ensure substantially continuous user identity. Along similar lines, a threshold for the degree of match within images of recorded features around the eye compared with images when the identity of the device wearer is known can be adjusted, depending on the desired level of security.

Compared with commercially available systems that, for example, are used to identify (or exclude) an individual upon entering a country, the present system may address the following question: At any given instant in time, do the characteristics of an iris of the individual wearing the headwear match a Gabor coefficient-based description of the iris of a single (i.e., target) individual? Technically, this is much less challenging than proving that an iris image matches or does not produce a match within a data base that might contain millions of iris patterns.

The CBID system can be implemented within headwear that includes a head-mounted display, eye-tracking, and/or one or more scene cameras that view the environment of the device wearer. Scene cameras may include sensors capturing "scene" information that would otherwise be indiscernible by a wearer such as energy at RF or IR wavelength. The headwear can also include other sensors such as a microphone, accelerometer, touch pad, ambient light detector, galvanic skin sensor, thermometer, pulse oximeter, electroencephalograph (EEG), electromyograph (EMG), electrocardiography (EKG) and heart rate variability (HRV) sensing local headwear positioning system, global positioning system (GPS), and/or electrical components to measure the structural integrity and/or performance of the headwear device. Substantially continuously acquired data from such wearable sensors can be tagged with user identification codes to ensure positive identification of the information source.

Continuous Biometric Identification (CBID)

FIG. 1 shows an exemplary embodiment of elements of a CBID system 100 that includes iris illumination sources 130, 135, and 140, a camera 125 oriented to view the iris 115 and/or other features of the eye, and a processing unit 165. Anatomically, the iris 115 surrounds a pupil 145 and is, itself, surrounded by sclera 150 or white region of the eye containing blood vessels and other identifiable markers. Periodically, eyelids 105, 110 obscure viewing the iris 115 and sclera 150 during eye blinks or during voluntary eye closures.

The processing unit 165 can generate and transmit, via a communications link 155, irisCodes and/or images of the eye to a remote processing unit 160 that is (or is functionally coupled to) a source and/or receiver of secure information. Transmissions via the communications link 155 between the processing unit 165 mounted on the headwear device 600 (FIG. 5) and the remote processing unit 160 can be encrypted and can employ combinations of both wired and wireless transmission 155 methods. Depending on the presence or absence of a substantially continuous positive identification, the remote processing unit 160 can take steps to allow or conceal the processing and/or transmission of secure information.

The illumination sources 130, 135, and 140 can be infrared or near infrared light emitting diodes (LEDs) or organic LEDs (OLEDs). The intensity of illumination sources 130, 135, and 140 can be controlled based on target brightness levels sensed within the camera's 125 field-of-view, e.g., as described in U.S. Pat. No. 8,890,946, the entire disclosure of which is expressly incorporated by reference herein.

The micro-camera 125 can incorporate sensing of electromagnetic radiation based on charge coupled device (CCD) or complementary metal oxide semiconductor (CMOS) technologies; hereinafter referred to as an imager. A micro-lens 120 focuses electromagnetic radiation from the region of the eye onto the sensing area of the camera 125.

The processing unit 165 can be a field-programmable gate array (FPGA), microcomputer, microcontroller, application specific integrated circuit (ASIC) or other computing device. The processing unit 165 can be a single device or processing functions can be performed by an assembly of separate physical devices.

Figure 2:
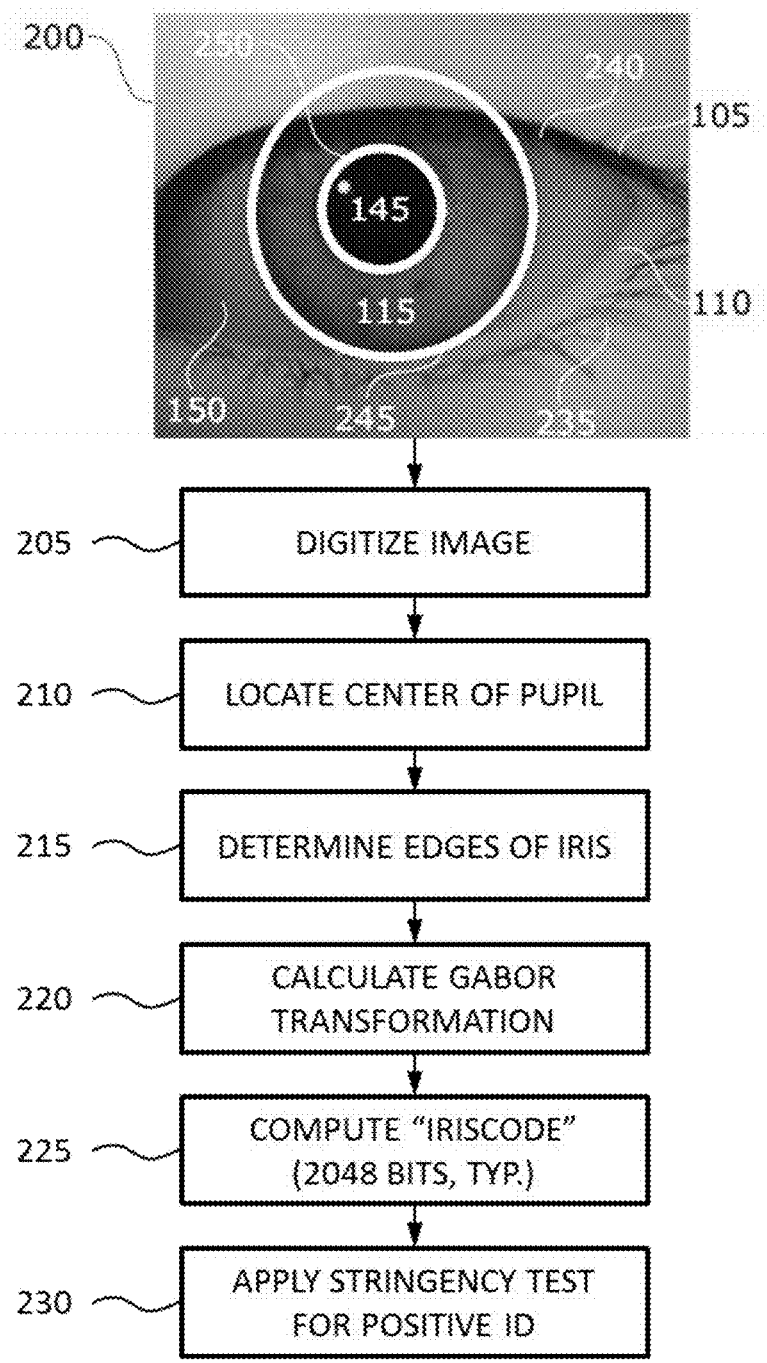
FIG. 2 illustrates exemplary steps used to determine the identity of a device wearer.

FIG. 2 shows an exemplary embodiment of steps to identify a device user. An image 200 that includes the region of the iris 115 is digitized (process 205) using so-called "frame grabbing" techniques that are well-known in the art. The center of the pupil 145 is determined (process 210) based on the location of the largest dark region within a digitized image 200 and/or identifying the center of mathematical representations of the boundary 250 between the pupil 145 and the iris 115. The inner edge of the iris 250 can be determined (process 215) based on the transition between the dark region of the pupil 145 and the less dark, marbled region of the iris 115. The outer edge of the iris (i.e., limbus) 245 is determined (process 215) based on the transition between the marbled or structured region of the iris 115 and the white region of the sclera 150 along with anatomical knowledge that irises 115 are approximately circular in shape. The inner 250 and outer 245 edges of the iris 115 can generally appear elliptical within camera images 200 when viewed from angles that are non-perpendicular to the surface of the eyeball at the center of the pupil 145. Thus, the general shapes tracked for inner 250 and outer 245 edges of an iris are approximately elliptical. Detailed construction of irisCodes must account for typical deviations from a circular shape of the iris 115, particularly the boundary between the iris and sclera 245.

A Gabor transformation calculation (process 220) is then applied to pixels within images 200 that are located between inner 250 and outer 245 edges of the iris 115. Coefficients of the Gabor transformation are then assembled into a so-called "irisCode" (process 225) where the most commonly used 2048-bit irisCode is assembled from the two most significant bits of Gabor transformation calculations in each region of the iris 115. In some cases, a region of the iris 115 may be obscured due to partial eyelid 105, 110 closure, shadows 240 or eyelashes 235. Stringency criteria can be associated with irisCodes (process 230) to account for such missing or uncertain information.

When the identity of a device wearer has been determined via an irisCode, an image of the region surrounding the iris 115 is stored and registered as belonging to the device wearer. This image can subsequently be used as a comparative reference under conditions when irisCode can no longer be computed as the eyeball moves about. The image of the iris 115 can become obscured because of shadows 240; blockage due to eyelids 105, 110 or eyelashes 235; or because the iris 115 is sufficiently off-axis compared to the central field-of-view of the camera 125. When these conditions occur, distinguishing features within the reference image are used to substantially continuously determine the identity of the device wearer. These features can include the sclera 150; locations and patterns of blood vessels within the sclera 150, the shape of eyelids 105, 110; and the locations and shapes of eyelashes 235 as well as supplementary biometric (i.e., physiological and anatomical) measures, as described further below.

Figure 3:
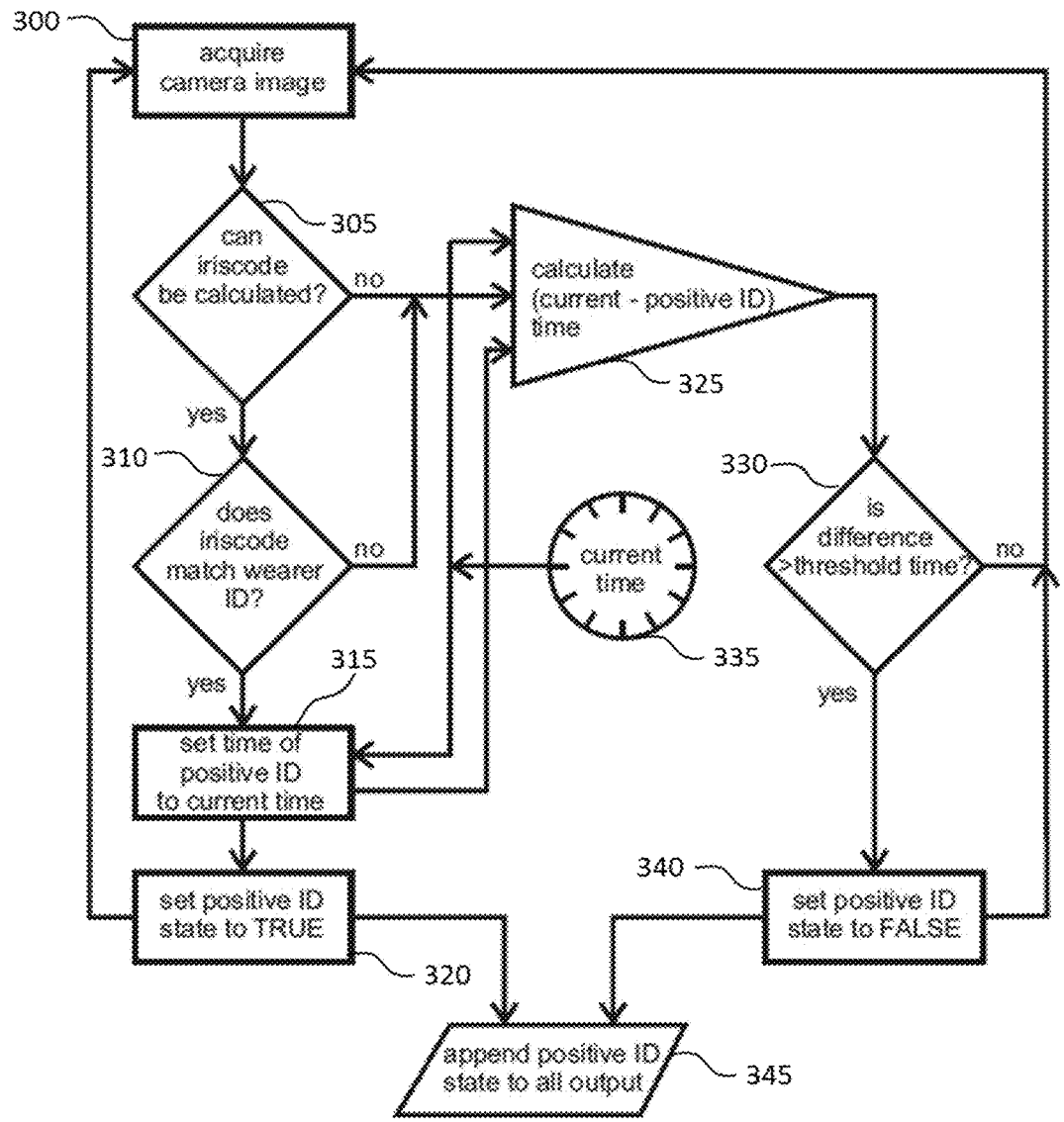
FIG. 3 is a flow chart showing an exemplary logic used to substantially continuously derive a device wearer identification state.

FIG. 3 is a flow chart illustrating a substantially continuous decision-making process for determining whether a device wearer is positively identified at a given time. This decision-making process begins by acquiring an image (process 300) from an iris-tracking camera 125 and attempting to calculate an irisCode. Methods for digitizing camera images and the calculation of irisCodes are more fully described by FIG. 2 and are known in the art, for example, as described in U.S. Pat. No. 5,291,560, the entire disclosure of which is expressly incorporated by reference herein. The next step (process 305) is a determination of whether a viable irisCode has been determined. Reasons for a non-viable irisCodes include a partially closed eyelid, a fully closed eyelid (i.e., a voluntary closure or involuntary blink), shadows 240 that obscure the iris 115, eyelashes 235 that obscure approximately rod-shaped regions, and/or an iris 115 that is turned well away from the center of the field-of-view of the camera 125.

If a viable irisCode can be calculated, it is compared (process 310) to a pre-determined irisCode of the intended or target device user. The stringency of this comparison can be adjusted, depending on the desired level of device user security. If there is a positive match with the wearer's identification, then the time of the positive match is set to the current time (process 315) acquired from a free-running clock 335, features in the region around the eye are stored and registered as belonging to the target device user (process 320), and the state of a positive-identification Boolean indicator is set to "true" (process 345).

If the irisCode cannot be calculated (process 305) then a check is made to determine if irisCodes have been unavailable for an extended period (process 325). If an irisCode had been determined recently, then features within the image of the region around the eye are compared (process 310) with images stored at times of positive identification (process 345). If there is a sufficient match of these features, then the positive-identification Boolean indicator is maintained in its "true" state and a new image is acquired.

If the newly determined iris code does not match that of the intended device wearer (process 325), or if an irisCode has not been calculated for some time (process 330) and there is an insufficient match of features around the eye (process 340); then the difference between the current time registered by a free-running clock (process 330) and the most recent time of a positive identification is calculated. If this difference is determined to be greater than a pre-determined threshold time, then the state of a positive-identification Boolean indicator is set to "false" (process 340).

The pre-determined threshold time is adjusted to a value that allows for brief periods of inability to positively identify a user, such as during "normal" device wearer blinks. Thus, as used herein, "continuously" and "substantially continuously" determinations can include such brief periods of inability to positively identify the user. Generally, the threshold time is set to a value between 0.1 seconds (i.e., the duration of a rapid blink) and 10 seconds, where the later value is the least secure, allowing a device wearer to look away from the headwear for brief periods. A typical threshold value is 0.3 seconds.

Upon acquiring a new image (process 300), the overall decision-making process is repeated to provide substantially continuous identification. The user identification status can be appended to all transmissions associated with the system (process 345). Alternatively, images of the iris 115 can be transferred to an external processing unit and the decision-making process for determining whether the device wearer is positively identified can be executed remotely.

Figure 4:
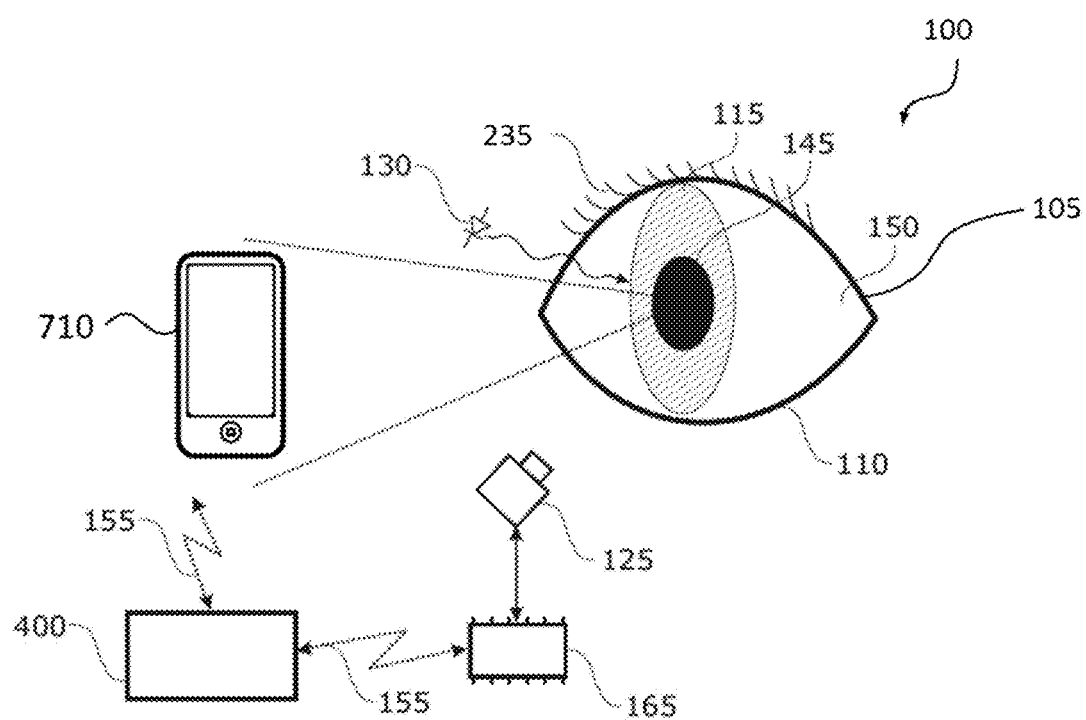
FIG. 4 is a schematic drawing of an exemplary embodiment of circuitry for controlling the viewing and generating secure information based on device wearer identity.

FIG. 4 is an exemplary embodiment during applications that control a display 710 and/or transmission of secure information 155 via an external device. Images of an iris and/or features in the region of the eye 115 are substantially continuously acquired by a camera 125 and, based on the degree of match within these images; a substantially continuous device wearer identification status is determined by a processing unit 165. Device wearer identification status is transferred via a communications link 155 to an external processing unit. Any number of other processing units 400 can then allow secure information to be displayed 710 and viewed by a substantially continuously authorized individual.

Biometric identification can occur during one or more times (i.e., sessions), or any combination of times that are before, during or after an eye-signal control process that requires user authentication. For example, an individual taking an examination might be required to execute an eye-signal command sequence that results in biometric authentication both before and after the examination period. An online purchase might require authentication before a purchase is made (e.g., during a time in which a pre-authorization step for the total cost for the transaction might be occurring) as well as simultaneous with the eye-signal sequence that results in the purchase. The reading of a secure legal document using eye-signal controls, and possibly other controls, may require repeated biometric identification that is synchronous with all eye signals used during the reading process.

Supplementary Biometric Measures

Another exemplary embodiment involves the use of anatomical and physiological features to further substantially continuously monitor both the identity and functional state of an individual. For accurate tracking of eye signals, the shape, dimensions, and/or relative spatial locations of anatomical features of the eye must be known to the headwear device. Thus, during normal operation, these features are generally available to the device since they form a foundational basis for many of the calibration coefficients that are used to produce accurate eye tracking. Together, they can also be used to (substantially continuously) verify the identity of a device wearer. This is particularly useful during periods when irisCodes are not continuously available such as during blinks, when the iris is obscured by eye lashes or other structures, and/or when the iris is pointed away from the camera(s) that view one or both eyes. Examples of such anatomical features that can be components of a user identity include:

corneal radius (including second-order parameters since the shape can be ellipsoidal)

pupil depth eyeball radius limbus radius offset between the optical and visual axis synthetic lens parameters (cataract surgery is performed 2.7 million times/year in the US to replace the natural lens with a synthetic lens)

various pathologies such as a pinguecula (yellowish raised thickening of the conjunctiva of the white (sclera) part of the eye), pterygium (wedge-shaped growth), strabismus (crossed eyes), amblyopia (lazy eye)

general eyelid position on the eye eyelash thickness, density, color, coverage, length eye fissure shape and measurements eyebrow hair, structure, location, color, depending upon the field-of-view (FOV) of the camera skin composition of the eyelid and surrounding tissue depending upon the FOV of the camera There are other anatomical factors, such as the size and shape of the nose (generally affecting how the device sits on the head and thus affecting positions of cameras and illumination sources relative to the eyes) that are less useful for user identification purposes. However, measures of distances between cameras and features of the eye (again, largely impacted by how the device rests on the nose) can be used to determine if a device has, for example, been removed from the head. If a device is removed from the head, an indication can be set that prohibits the device from enacting highly secure actions or transactions until the device is replaced on the head and a high-stringency (e.g., matched irisCode) identification procedure is executed.

Physiological responses measured by the device can also be components of unique identifiers within the identification or "signature" of an individual. Examples of physiological features that are measured by the device and thus, can be components of a user identity include:

the degree of pupil constriction or dilation in response to changes in light (highly dependent on the age of the device wearer) or in response to specific stimuli (light, emotional response, cognitive load)

the rate of pupil constriction or dilation in response to changes in light horizontal and vertical displacements of the pupil as the pupil constricts or dilates the range and rate of voluntary saccadic movements the range, frequency, and rate of micro-saccades the degree, presence, range, frequency and patterns of eye tremors, drifts and other eye movements the degree of correlation between vergence eye movements (when monitoring both eyes)

the rate at which a device wearer identifies and tracks a new target blink behavior such as frequency, rate, duration, context of occurrence the manner in which a user performs eye signals that may be part of grammar or interaction model for eye-control eye signals in the context of visual stimuli, biometric data, and other data including location, time, activity, physical or cognitive state and intent movement of the eyelid and surrounding skin tissue, possibly based upon viewable skin, muscles and motions catalogued in the "Facial Actions Coding System" (FACS)

various parameters associated with the "experience" of a device wearer (versus a novice user)

The later features in this list, device wearer experience, may not be strictly classified as a "physiological" measure. Experience is reflected within a cluster of coefficients maintained by the device that reflects the "experience" of the user based primarily on a time spent with the device, fixation times, history of reaction times, contextualization of various data types, and the frequency of unintended selections (i.e., subsequently corrected) by the device wearer. One example of these data used by the device is to, adjust the speed of so-called "eyemovers" (i.e., targets prompting the user to move their eye(s) to make a 1 of N selection) during smooth pursuit eye signals.

User experience is an example of a number of behavioral characteristics that can be measured when performing actions such as surveying an object or reading text. These behavioral biometrics or "style" of performing activities can be based on factors such as past experience, familiarity, interest, and so on. Some behavioral characteristics can include anatomical and physiological influences. As an analogy, the gait of an individual is a large-scale example of such an activity. In the case of eye signals, the exact attachment points and strength of contraction of the six muscles that control each eye can influence the behavioral biometrics of eye movements.

As described in Systems and Methods for Biomechanically-Based Eye Signals for Interacting with Real and Virtual Objects, incorporated by reference herein, one method to classify eye signals is the application of neural networks that have been trained to discern the eye movement characteristics of an individual. User experience as well as the particular movement characteristics (i.e., by analogy, the "eye-gait" of an individual) can be used to identify an individual.

The combination of these anatomical, physiological, and/or behavioral features are unique to individuals; although in some cases, such as distinguishing identical twins, distinctive variations of some anatomical features may be too small for practical use in biometric identification. Cognizant of such short-comings, it is the combination of independent features that produce distinguishing power. For example, if a measurement of limbus radius has the resolution to consistently (i.e., repeatedly) categorize individuals into one of ten groups and the maximum speed attained during large saccadic movements (presumably not dependent on limbus radius) can further categorize individuals into one of fifteen groups, then the combined power of these two independent measures in identifying an individual is one in 10×15=150. The multiplicative nature of independent and distinguishing features provides significant power to distinguish individuals.

Particularly during times when iris identification is not available (e.g., when the iris is obscured by an eyelid, eyelashes, or is out of focus), anatomical, physiological, and behavioral parameters can be used to maintain the continuity of user identity. In addition, for many applications, the device is required to attempt to determine if the characteristics of the wearer match the characteristics of a single, identified individual or is a member of a small number of known individuals. This is a much simpler classification process than, for example, identifying if a person among a large number of individuals than might be excluded from wearing the device. A deviation in one or more anatomical, physiological, or behavioral measurements may indicate that a switch in device user has taken place.

Such identifying characteristics could also be combined with other security tokens, such as information tokens (passwords), physical tokens (keys), produced tokens (speech, gestures, writing), other biometric tokens (fingerprint, voiceprint), and more.

Another exemplary embodiment of the systems and methods herein involves the use of an iris identification to locate and retrieve calibration parameters that are associated with an individual user. When an unknown or new device user places a device on his/her head, calibration parameters are generally unknown. Through a process of either directing the user to look in the general direction of a camera viewing the eye or by having one or more cameras view the iris during normal eye movements, an initial irisCode can be generated.

Multiple Camera Configurations

Figure 5:
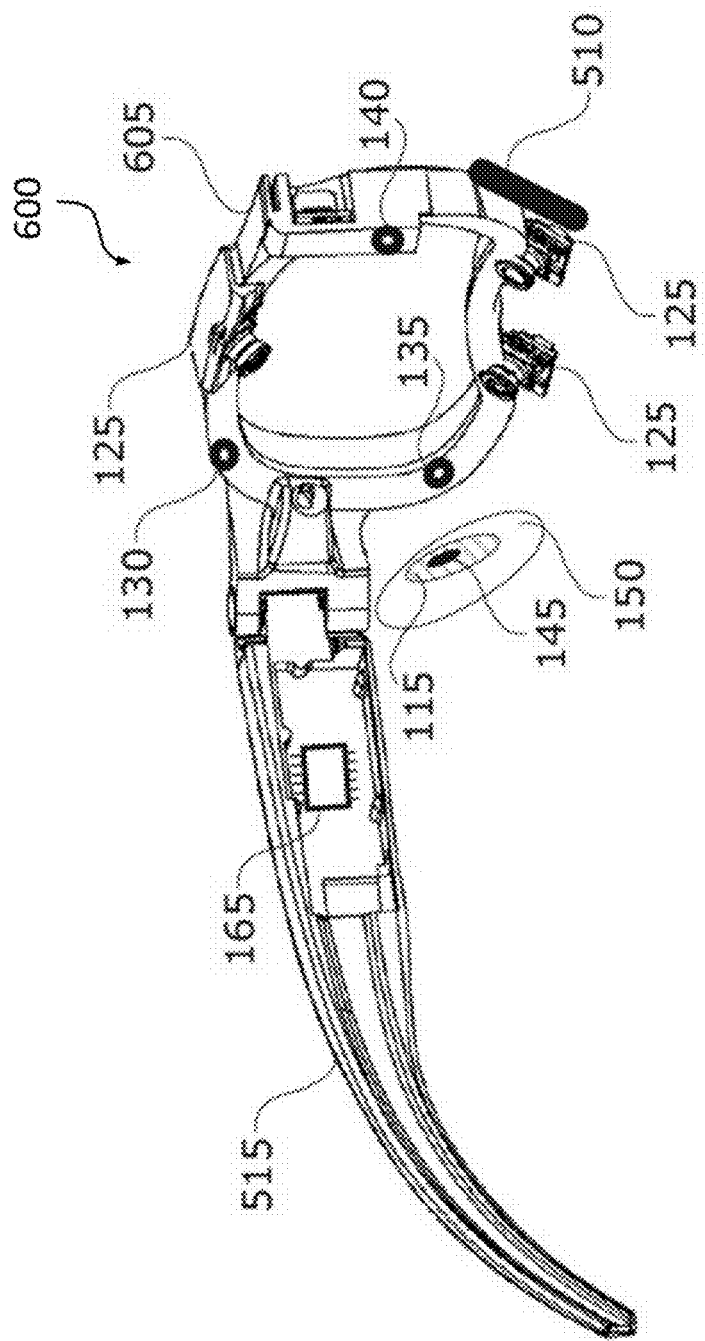
FIG. 5 is a perspective view illustrating exemplary locations of multiple illumination sources and multiple cameras pointing at a single iris.
Figure 6:
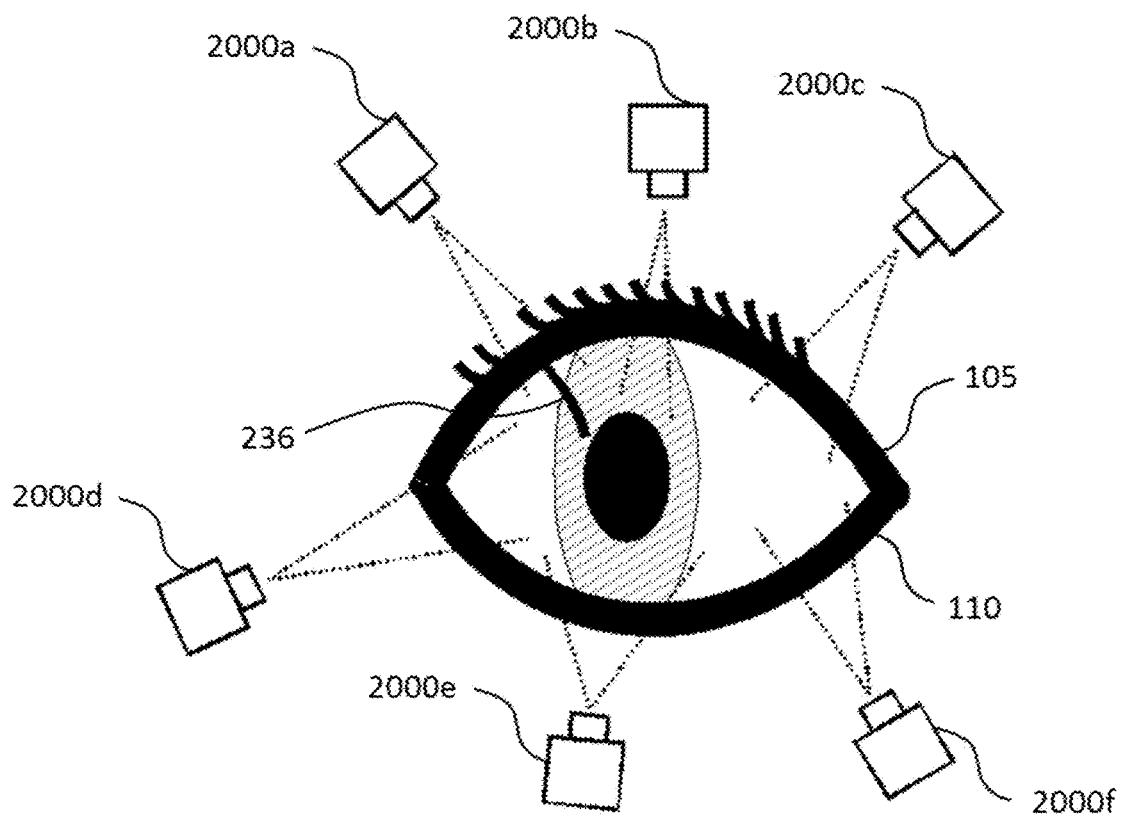
FIG. 6 depicts an exemplary embodiment of a multi-camera imaging system.

When portions of an iris may be obscured during normal movements of an eye, it may be useful to "stitch together" portions of iris images that have been taken at different times by a single camera and/or iris images viewed form different directions using multiple cameras. The use of multiple cameras to view an eye is illustrated in FIGS. 5 and 6.

Alternatively, irisCodes themselves (i.e., computed following the segmentation process) can be "stitched together" from different images of the iris. Once again, these images may be taken at different times, or by different cameras or combinations of different times and camera angles. As a component of this approach, portions of an iris that are successfully viewed within multiple images can be averaged (either before or after computing an irisCode) in order to improve reliability and/or combat the effects of image noise.

One of the issues associated with unobtrusive CBID is associated with the fact that the camera(s) directed at the eye is generally "off-axis" compared with either the visual or optical axis of the eye. This results in an "off-axis" view of the iris. Furthermore, as the eyeball moves about during normal and eye-signal functions, the degree that the iris is "off-axis" varies. If an iris template is registered when the user is looking in a given direction, it becomes increasingly difficult to identify the same iris as a match as the eye rotates away from the direction at which the iris template was registered.

One solution to the "off-axis" issue is the use of multiple cameras that observe an eye at different viewing angles. At any given time, images can be selected from the camera that is closest to being "on-axis;" discerned, for example, based on inner and outer iris boundaries that are most circular (versus being highly elliptical). The most "on-axis" camera may change as the eye moves about during normal activities.

Another solution for this issue is to store multiple iris templates for an individual collected at different viewing directions. Since, as a result of eye tracking, the viewing direction of a user is known, it is possible to 1) store irisCodes at multiple, known viewing directions and 2) subsequently compare irisCodes collected at any time at known viewing directions to irisCodes collected and registered at the same or closest viewing direction.

The degree of off-axis viewing can be reduced using multiple cameras and/or multiple irisCodes. By selecting images from the camera that is closest to being "on-axis" the most direct view of the iris can be obtained. Both the registering of irisCodes from known individuals and identification of an individual in real time can be based on images for the most on-axis camera to improve identification robustness.

Along similar lines, all of these schemes are also consistent with numerically "rotating" the image of the iris to be on-axis prior to registering a template or compute an irisCode in real time for identification. In many eye-tracking schemes, the angle between the optical axis and the direction of the viewing camera must be known in order to compute gaze direction. This provides the key coefficients to apply a rotational transform, making the image of the eye appear as if it is being viewed along an axis perpendicular to the center of the pupil (or limbus).

These irisCodes could be collected using conventional lenses or holographic lenses to accommodate desired views. IrisCodes can also be collected in which images of the eye are reflected off of one or more reflective surfaces. Such surfaces can be designed around a single, large reflective surface or multiple reflective surfaces (i.e., multiple micromirrors). These mirror-based systems can be in the form of conventional reflective surfaces or within so-called free-form optical pathways designed to minimize physical characteristics (e.g., weight, size) of the optical system. They can also reflect selected wavelengths of light (e.g., so-called "hot mirrors") to facilitate CBID without obstructing views at visible wavelengths of light. Free-form optics designs allow cameras to be placed unobtrusively along the edge of eyewear while maintaining the ability to view the eye at or near its optical axis. Images of the eye(s) can alternatively be collected by one or more detectors (e.g., photodiodes) where spatial selection and resolution is controlled by switchable surfaces such as those found in switchable Bragg gratings-based (SBG) devices.

FIG. 5 shows an exemplary system 600 that illustrates placement locations for multiple illumination sources 130, 135, 140 and multiple cameras 125. Both illumination sources 130, 135, 140 and cameras 125 are directed at the region of one eye containing an iris 115 along with a central pupil 145 and surrounding sclera 150. Compared to a single light source 400, the use of multiple illumination sources 130, 135, 140 ensures a well-lighted iris 115 over a wider range of eye movements by the device wearer and reduces tendencies to generate shadows 240. The use of multiple cameras 125 enhances the ability to image an iris on-axis over a wider range of viewing angles by the device wearer and reduces distortion of iris images that result from camera-based imaging at more acute angles.

Cameras may also be configured to capture views of eyes, eye features, eyelids, eyelashes, eyebrows, surrounding skin, and facial muscles such that regions of interest may be viewed individually, adjacently, as a non-contiguous collection of views, or as adjacent regions stitched together. The multiple cameras may be supported by multiple LEDs or illumination sources configured to illuminate regions viewed by the cameras. The capture of eyes, pupils, features, eyelids, eyebrows, and skin can be used to measure emotional response to stimuli from an on-screen display or within a user's environment. This may be used, for example, for interpersonal communication, for studies on emotional reaction associated with gaze direction, and for emotionally-based interaction in games. The relationship between the gaze directions of the player measured by the cameras, coupled with other facial information can be interpreted to define an emotional state of a user. Actors in a game or entertainment experience may then respond with activity and gaze direction away from or toward the user, synchronized with user eye, face, head, hand body, and biometric behavior, communicating emotion through rendered facial features, body, and eye-behavior, to stimulate variable, and dynamic levels of character/user emotional engagements and interactions. These actors may be artificially intelligent characters, or they may be avatars for remote human characters, and the user may be represented by a remote avatar as well.

In the case of the system 600 illustrated in FIG. 5, components are mounted within a pair of eyeglass frames. The perspective drawing in FIG. 5 shows only the left half of the glasses directed at the left eye simply for clarification. The eyeglass frames rest on the head utilizing a nose piece 510 and ear stem 515. In this example, an on-board processing unit 165 is located within the left ear stem 515. Although not shown in this view, a battery pack that supplies portable power to the device can, for example, be mounted in the right ear stem. Although not well-seen in this perspective view, optionally, a scene camera on the frame can be used to view the environment of the device wearer. Although not shown in this view, optionally, one or more displays presenting monocular or stereo imagery to the user's eye(s) may also be mounted in the frame. The frame may contain display(s) that present imagery to augment the user's view of the real world, imagery presented off axis or not in the user's direct line of sight, or immersive imagery creating virtual reality.

An exemplary configuration of multiple cameras is illustrated in FIG. 6. Multiple cameras 2000a-f can circumvent obstructions including the upper eyelid 105, lower eyelid 110, and any obscuring eye lashes 236 via multiple views of the eye. When viewed from different angles (i.e., observed by different cameras), regions obscured by a particular obstruction (e.g., eye lash 236 in FIG. 6) differ. Under these conditions, full representations of the surface of an eye can be reconstructed by extracting or "stitching together" information from images collected using images from the different cameras. Different cameras with differing views of the eye can have overlapping or non-overlapping fields-of-view. Different cameras can also have differing lenses, optical filters, frame rates, or resolutions. There can also be a mix of 2D and 3D imaging cameras. Any combination of camera or cameras 2000a-f can be enabled (e.g., powered on and functional) at any time. Access to images collected under a range of sampling conditions improves the robustness of iris recognition, pupil recognition, feature recognition, and eye-signal recognition.

The use of multiple cameras can also be used to construct three-dimensional views of the eye. An alternative method for viewing three-dimensional structures within the eye is spatial phased imaging. Regardless of methods to determine the shapes, sizes, and locations of structures within the eye, knowledge of their three-dimensional morphology can increase the resolution, convenience (i.e., reduced requirements for calibration), and robustness of gaze tracking.

Multiple-cameras directed at both eyes (i.e., each eye viewed by multiple cameras) further increase the accuracy of vergence measurements. Vergence literally adds an additional dimension to eye-signal controls. For example, by using vergence, icons within different layers of selection panels can be specified by a device wearer.

Multiple cameras substantially simultaneously viewing an eye over a wide angular range can also be used to observe movements of surrounding features including eyelids, skin, eyebrows, and even portions of facial muscles. Movements within these features can be used to extract other user conditions including emotional state. In exemplary embodiments, other eye measurements that indicate emotional states include pupil dilation, lens shape, and heart rate. In additional embodiments, using one or more cameras, it is possible to determine the heart rate of a user by determining the rate of small expansions and constrictions within images of the vasculature of the eye, particularly within the sclera.

Determining User Conditions Including Emotional State

It is also possible to add additional sensors to the headwear to determine device user conditions and emotional states. Examples of substantially continuously monitored data include pulse oximetry, galvanic skin resistance, EEG, ECG, and temperature sensors.

Device knowledge of user emotion can be used for identification as well as to regulate a wide range of applications. Emotions can be a particularly powerful adjunctive input to gaming. For example, the response of a game to fear or stress by a user might be to make tasks involved in the gaming process easier. On the other hand, stress expressed within a multi-user game might be used to trigger defeat. Reflections of the emotions of a "real" person can be coupled to an avatar, where the actions and responses of the avatar are influenced by the emotional state.

Another area in which knowledge of user emotion can be valuable is within conferencing that involves the generation of synthetic facial expressions. Compared with the transmission of streaming video during teleconferencing, the construction and viewing of one or more synthetic faces can greatly reduce the bandwidth required among conferencing locations. An issue that arises with the viewing of synthetic faces is a lack of appropriate facial expressions. This tends to generate an "uncomfortable" feeling on the part of viewers. Knowledge of the emotional state (and true identity) of the individual who is the source of conferencing content allows more appropriate and dynamic synthetic facial expressions to be generated. Emotional states can (as desired) be restricted or broadcast widely to any number or subset of recipients.

Within interpersonal interactions enacted via synthetic faces or avatars, it can also be possible to isolate interactions to a pair of individuals or a small group, even within the "virtual" presence of other avatars. This is particularly useful in both gaming and teleconferencing applications. Similar to real-world conversation between or among individuals in a room, simultaneous and multiple virtual conversations can be held, including with "virtual eye-to-eye contact" without restrictions on, for example, the identity or geographic locations of real-world participants.

Cognitive load is a primary contributor to many emotional states. Under given lighting conditions, pupil diameter is highly reflective of cognitive load. Thus, with known lighting conditions that can, for example, be assessed from overall intensity levels observed in scene camera images, it is possible to substantially continuously assess cognitive load (and changes in cognitive load) by observing changes in pupil diameter. Similar to knowledge of emotional state, the inclusion of cognitive load as an input has a wide range of applications in gaming, conferencing, the pace of document review, the rate and/or level of difficulty of examination questions, assessment of the effectiveness of advertising, medical assessments including post-traumatic stress disorder, psychological assessments upon viewing images, etc.

The use of one or more scene (i.e., viewing the user's environment) cameras coupled with multiple cameras to view an eye provides even greater potential for an immersive environment. For example, in gaming operations, the environment of a device wearer can be projected into the environment(s) of avatars or other representations of players within a gaming space. Head movements and/or the viewing of objects in the "real world" can be translated into a virtual environment. The translation of real and virtual environments is particularly effective for a device wearer within a three-dimensional "cave" projection system, but similar effects can be obtained using a large display screen or multiple display screens.

The creation of an "environmental context" using multiple scene cameras can provide increased user satisfaction, safety, performance enhancement, etc. For example, it is possible to orient images during a conference to view locations under observation by one or more selected conference participants in real time. Knowing what an individual (particularly a conference presenter) is focused on is extremely helpful in interpreting what the individual is trying to convey. Conversely, if it is apparent that one or more audience members do not appear interested is the content that is being presented, then this may be a cue to change content.

CBID-Based Eye-Signal Device Configurations

Depending on the application(s), the functions of a CBID-based eye-signal device can be arranged in a large number of configurations. Processing and/or authentication can be self-contained and/or performed remotely. Authentication can be applied to outgoing data and/or restrict the flow of incoming data. Device operation can be restricted to a single person or group of people, or left unrestricted. Device operation can be further restricted to perform tasks only under certain operating conditions. The display of information can be hidden from all others than the device user, or available for all to see. Authentication can be applied only upon user request or automatically to some or all data. Eye-signal control of other devices can be confined to an individual, group of individuals, or unrestricted.

The following table lists some of the classes of configurations and examples of each. Definitions and acronyms use to describe eye-signal device configurations are:

IC—irisCode: the result of applying pattern-recognition techniques to images of an eye to quantify the epigenetic patterns within an iris into comparable bit-patterns for the purpose of biometric identification.

EIC—encrypted IC: an irisCode that has been encrypted so that it cannot be reverse engineered to an original image of the iris or any other iris-based, derived parameter.

TEIC—target EIC: an identified EIC in which a match with an IC computed from an image of an eye indicates association and thus, a positive biometric identification.

CBID—continuous biometric identification: the repeated process of biometric identification that can be performed either on a headset device or remotely by transmitting EICs, or images of one or both eyes to a remote processor. CBID can occur at a fixed rate (e.g., 30 times per second) or an asynchronous rate (e.g., each time the device is moved or re-mounted).

UUID—universally unique identifier: a firmware-encoded unique identifier (i.e., numeric code) for any processing device, including headset devices.

GPS—global positioning system: a satellite-based navigation system that can determine the location of a device anywhere on or near the surface of the earth.

TABLE 1

| Classes of CBID Device Configurations | | |
|---|---|---|
| CLASS | Description | Example |
| stand-alone, 1 of 1 | single TEIC stored within headset with no off-headset communication required for CBID | recognizes the sole owner/user of a device that is inoperative otherwise |

TABLE 1-continued

Classes of CBID Device Configurations

| CLASS | Description | Example |
| --- | --- | --- |
| stand-alone, 1 of N | "N" TEICs stored on headset with no off-headset communication required for CBID | recognize an individual member of a family, all of whom are permitted to use a device (e.g., to dynamically load calibration factors associated with each user) |
| remote TEIC, 1 of 1 | single TEIC transmitted to the device from a remote site | pay-per-view rental of a headset |
| remote TEICs, 1 of N | multiple, "allowable" TEICs transmitted to the device from a remote site | enabling a cluster of general-use headsets available to any or all employees within a business |
| headset transmits EIC | continuously or periodically, the headset transmits an EIC to remote site where user ID is determined (often from a large data base) | online purchase from an online "store" in which a user has been registered with no restrictions on the device used to make a purchase |
| headset transmits EIC & UUID | continuously or periodically, the headset transmits an EIC & UUID to remote site where user and headset IDs are determined (often from a large data base) | online purchase from an online "store" in which both a user and specific device have been registered |
| exclusionary TEICs | use CBID to determine if a user should be excluded from use or other access where comparisons can be on the headset or remote | determine if user is on a "no-fly" list |
| associate data to a single individual | retrieved or generated data file(s) that can only be deciphered under CBID of a single person | confidential list of traditional passwords |
| "eyes-only" viewing by a single individual | CBID coupled with HUD display with sight shields in place; data transmitted only when there is positive CBID; dummy data may be transmitted otherwise | taking an examination within a massively online course |
| group information release | data file(s) that can only be deciphered under CBID one member of a group of individuals | medical records made available to primary care doctor, specialist, and patient |
| structured information release | information content that can be varied, based on what is known about the identity of the viewer | structured advertising based on the demographic of an identified viewer |
| data set displayed on HUD | confirmation that a data set (e.g., body of text) has been sent to a specific CBID user where the user may view none, all or a portion of the data set | a device license agreement sent to a user |
| data set viewed on HUD | confirmation that an entire data set (e.g., text, picture, graphics) has been actually viewed a specific user using eye tracking with CBID to follow each data set item | confirmation that all components of a legal document have been viewed |
| data set presented on display device | confirmation that a data set (e.g., text) has been sent a specific CBID user's display (e.g., monitor, phone, tablet) as confirmed by the scene camera where the user may view none, all or a portion of the data set | confirmation that a notice of changes in terms and conditions has been sent to a user |
| data set viewed on display device | confirmation that an entire data set (e.g., text, picture, graphics) has been actually viewed by a specific CBID user using eye tracking directed at an external display device where the scene camera can also confirm receipt of content (e.g., using embedded QR codes) | confirmation of informed consent related to legal documents |

TABLE 1-continued

Classes of CBID Device Configurations

| CLASS | Description | Example |
| --- | --- | --- |
| checklist verification | using a scene camera coupled with eye tracking & CBID, verify that an identified individual has viewed each item in a checklist | pre-flight inspection by a pilot |
| "black box" recorder | CBID (& other data) stored on device within non-volatile memory for a period of time (hours, days, etc.). Data set can also include eye tracking and/or images (e.g., to determine what was being viewed prior to an emergency situation) | identification of a vehicle driver & possibly identifying pre-accident driver distractions |
| user-dependent applications | based on CBID, offer access to a set of individually selected applications and data sets | retrieve e-mail based on user identification where another user would be offered separate e-mail and applications access |
| user-tagged data | allow a user to automatically have his/her identity added to any transmitted data set | outgoing text and e-mail can (optionally) be tagged to indicate the CBID user is the author |
| electronic signature | allow a series of simple steps including CBID to "electronically sign" and time-stamp a data set | electronically "sign" legal documents |
| mutual identification | data set(s) transmitted only in presence of multiple CBID-identified individuals (applied to 2 or more individuals) | administration of an examination that must take place in the presence of both student and an instructor |
| mutual identification with explicit user permission | data set(s) transmitted only in presence of CBID-identification and explicit allowance by all individuals | exchange of personal information between/among people who have just met |
| object recognition within scene images | scene camera used to recognize a bar code, QR code, or object/container observed from any direction viewed by a CBID-identified individual | purchases made in a bricks-and-mortar store that requires no till or check stand |
| recognition of specific objects at known locations | scene camera recognizes QR code, barcode, physical structure, or other identifying marks/signage to gain access to information or control | remote control of door opening for authorized personnel only |
| location-sensitive user identification | EIC and GPS location transmitted to processor for authentication | gaining or restricting access to a building based on user identification |
| geographic confinement | CBID couple with GPS to track the location of an individual | tracking and allowing an individual under house arrest access to certain resources |
| interaction confinement | CBID coupled with image recognition within scene camera images to identify an individual's environment | tracking an individual restricted from entering a casino or interacting with another individual |
| time-sensitive user identification | release of information and/or user control based on CBID and current date/time | ensure legal purchase of alcohol or other age-sensitive materials to an individual |
| other biometric sensors | data from pulse oximeter (e.g., irregular pulse), EEG (e.g., epileptic fit), and/or other sensing devices combined with CBID for long term monitoring and/or identification of acute situations | automatic 911 call with user identification (that can be linked to medical history), "vitals," and geographic location |
| unlocking/accessing other devices | when positive CBID is present, permit on-device access to a library of access code, tokens, passwords, etc. to interact with other processors that require some form of user verification | based on CBID, interact with an automated teller machine |

TABLE 1-continued

Classes of CBID Device Configurations

| CLASS | Description | Example |
| --- | --- | --- |
| extremely high security applications | headset incorporates anti-spoofing measures including monitoring evoked pupillary responses, heart rate (e.g., by visualizing blood vessels), headset tampering, etc. | gaining access to highly secure military sites |
| historical record | CBID with time-stamps archived with other data streams (video, audio, biometric, GPS, etc.) for historical record keeping | proving the past activities of an individual under investigation |
| personal privacy | automatically encrypt archival data sets (within the recording headset) to restrict access to the actual device wearer at the time a recording was made | restricting access to the audio/video of a private conversation |
| group privacy | automatically restrict access to historically recorded data sets to any CBID-enabled device wearer present at the time a recording was made | restricting access to the audio/video of a conference to participants |
| extended personal memory | CBID with time-stamps archived with other data streams (video, audio, biometric, GPS, etc.) for personal use | locate records of an event relative to another event. |
| extended personal memory with mutual identification | using encryption, the viewing of historically recorded data sets can be restricted to mutually identified (specifically viewed at the time of recording) participants within an interaction | restricting access of a data set of a private conversation to CBID participants |
| indexed extended personal memory | within recorded data sets, include a searchable log of CBID and time-stamps with recognition of objects and/or words within audio/visual data streams, GPS location, and other components within data streams | address the question: When/where is the last time I saw my car keys? |
| user-specific data retrieval | data feeds and searches can be "tuned" to the interests of a CBID individual | list hockey (versus basketball or some other sport) scores first |
| local device control | wirelessly control a local device (without needing the internet) | control household thermostat by an identified adult (e.g., not a child) |
| remote device control | control a remote device using the internet | remotely turn on household entry lights |

The above table refers to the transmission and comparison of EICs; however, in some cases it is algorithmically possible to convert images of eyes into ICs and subsequently into EICs. Thus, CBID can equivalently involve comparisons and/or the exchange of information involving images of irises, ICs, EICs, or other derived parameters. Similarly, data bases used for biometric comparisons could equivalently (for the purposes of identification) contain ICs, EICs, images of eyes, images of faces (including eyes), images of irises, anatomical features of the eye, so-called "unfolded" (i.e., expressed in polar coordinates) iris images, images of other eye features including blood vessels in the sclera, limbus, or other captured or derived parameters. Therefore, references to exchanges or comparisons of EICs also refer to the exchange or comparison of any other derived data sets for the purpose of biometric identification.

Figure 7:
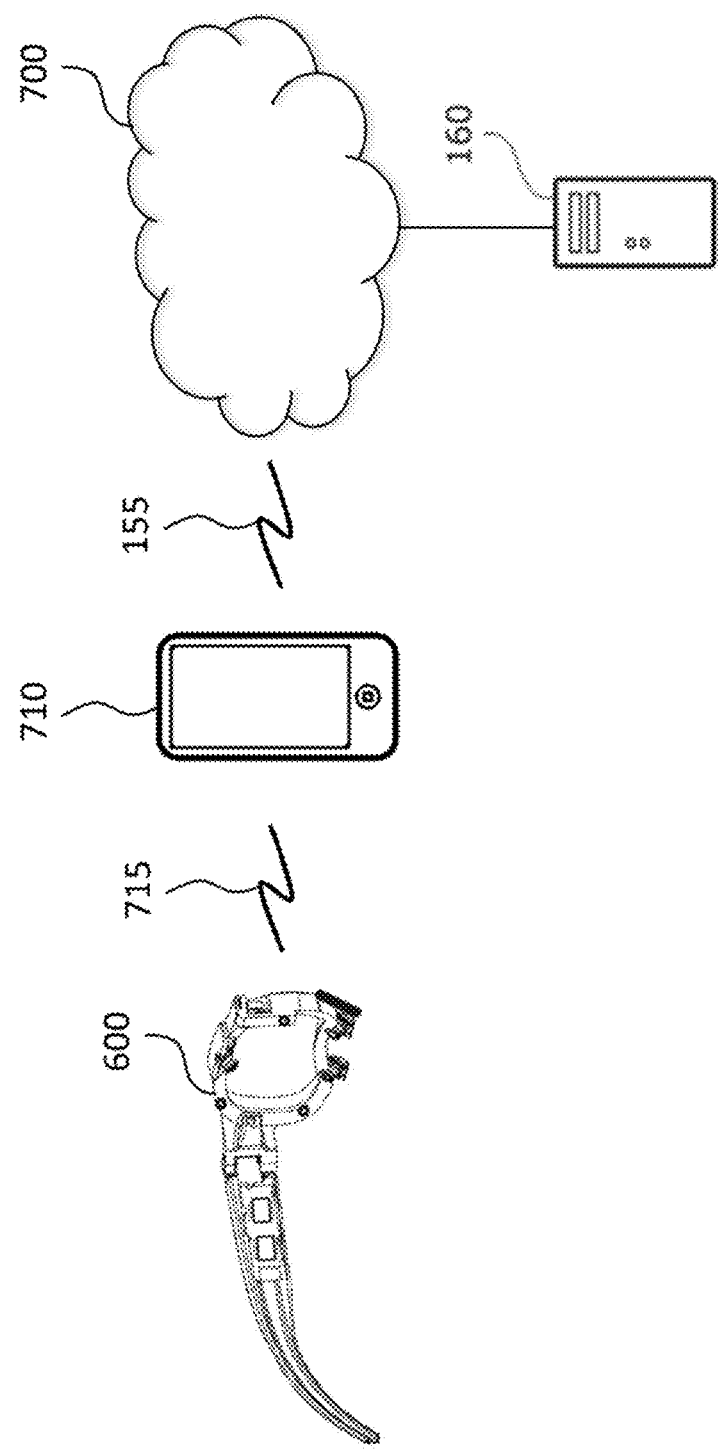
FIG. 7 depicts one embodiment of the headwear communicating with a network.

Once an irisCode has been calculated, it can be used in a search within a data base of known irisCodes and/or supplementary biometric measures. If an irisCode (and other measures) match is found, the associated calibration factors and other information (user name, age, gender, etc.) can be transmitted back to the headset device for use during eye tracking and other operations. This search can take place within a number of different platform configurations:

- The headset itself can contain a (typically small) number of irisCodes and calibration sets, for example, so that any member of a family can use a headset. IrisCode generation, searching, and matching is performed entirely on the headset.
- An irisCode or iris image can be sent to a specific remote processor for identification and matching. This processor can service a set of headwear devices, for example, within a home, business, school, theater, or geographic region.
- An irisCode or iris image can be sent to the cloud for identification and matching. Cloud-based retrieval of an identified person's data set allows calibration and other data associated with an individual to be available for any headset device used anytime, anywhere in the world. Unaided retrieval of calibration and other data will appear to a user as an "instant on" feature of any wearable device. The overall data flow for this configuration is shown in FIG. 7.

Once a user identification has been established, it is also possible to apply a calibration set gathered on one device form factor to another device form factor. For example, if the design of a device is upgraded and the location and/or orientation of the camera(s) and illumination sources(s) within the headset are affected by the upgrade, known displacements between old and upgraded devices can be added to calibration sets. This allows a user to utilize a single calibration set among multiple wearable devices that may have the same or different form factors.

In additional embodiments, CBID can be used to enable or disable "eye signals" or eye-signal controls that are described in Systems and Methods for Biomechanically-based Eye Signals for Interacting with Real and Virtual Objects, incorporated by reference herein. The performance of all eye signals or a subset of eye signals can be made contingent on the presence of CBID. Such eye signals can include those made solely with one or both eyes of the device wearer as well as those in which there is interaction with real world or other virtual objects. For example, eye signals can include the viewing by a device user (using a scene camera pointed outward) of a gesture made by the device wearer's finger. Such gestures can be made effective (i.e., result in an action) exclusively under CBID conditions.

In further embodiments, CBID-enabled actions can be restricted to times when there are identified person(s) or other identified objects present within the field-of-view of one or more scene cameras. Facial recognition, object recognition, and/or other forms of identification can be used to verify the co-location of the device wearer and such objects including one or more other, identified individuals. Actions can be restricted, for example, to be performed only in the presence of those individuals.

Alternatively, the presence and/or approval of one or more other individuals can be performed by another CBID-based device worn by the individual(s). In this case, the individual(s) can be co-located with other device-identified individuals, or located remotely with authentication transmitted either directly between devices (optionally involving intervening data transmission devices) or via a more centralized (e.g., cloud-based) authentication service. In the case of co-localized individuals, the transmission of authentication credentials can, if desired, be further restricted to near field communications (NFC, i.e., specifically excluding the use of other data transmission devices).

Conversely, the presence of an unidentified individual in the environment of the device wearer and/or one or more identified individuals that are specifically designated not to be present during the performance of an action can prohibit the device from performing any action or a subset of possible actions. Prohibition can be extended to exclude the presence of any objects in the environment including specific headset devices (e.g., identified by UUID during transmissions), cameras, microphones, hostile appearance (e.g., in military or policing situations), and the like.

Along similar lines, the performance of an action and/or presence of an object (including a person) in the device wearers environment can be cause for revoking the ability, either temporarily or permanently, the authority to perfume actions based on CBID. Revocation can also be performed based on instructions from a remote source that might, for example, determine that fraudulent activities have been, or are being, performed. The revoking of credentials can be limited to an individual, group of individuals, device, specific function or group of functions.

CBID-Enabled, Secure Purchasing Transactions

Figure 8:
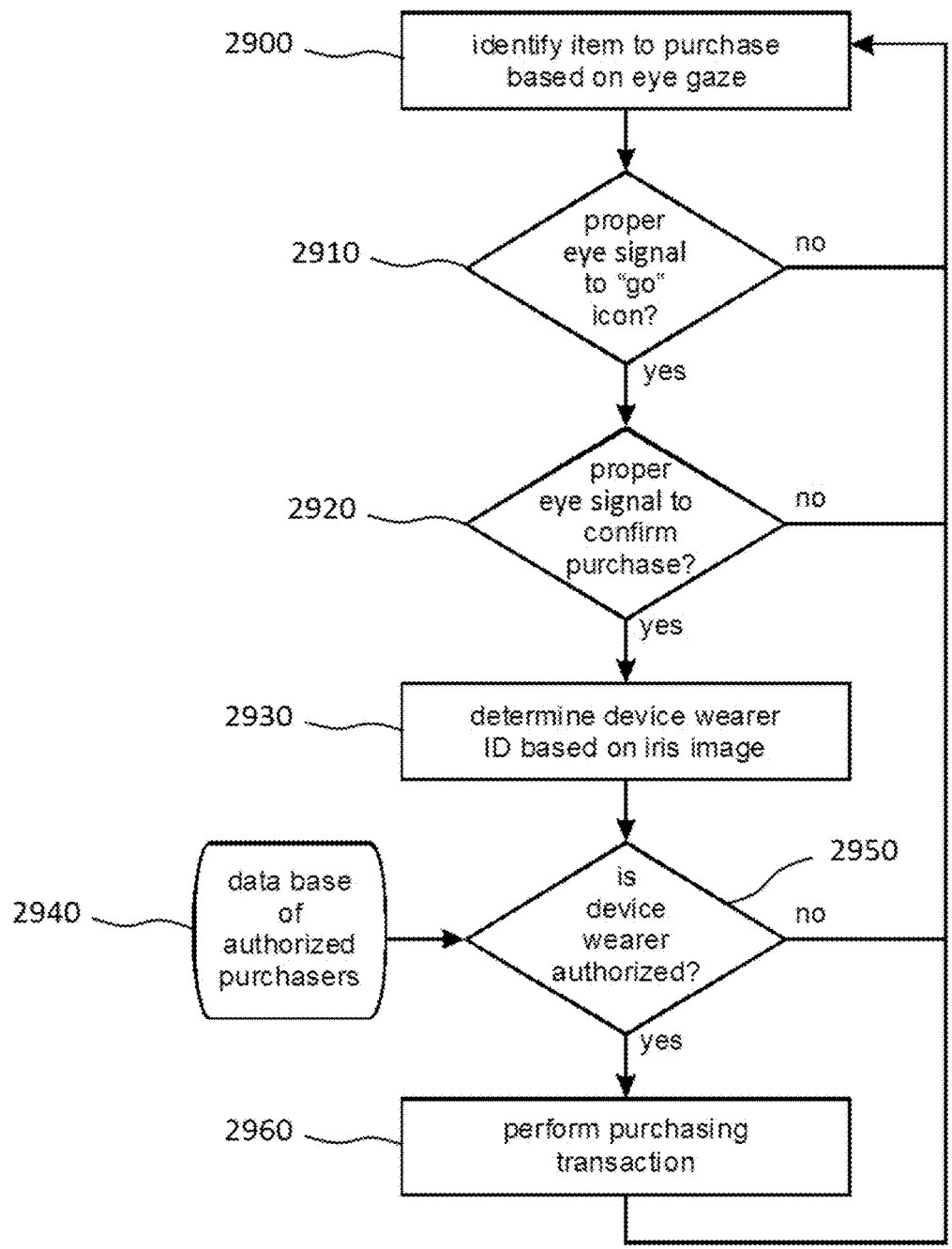
FIG. 8 is a flow chart of exemplary steps taken to perform an online, secure purchase.

In another embodiment of secure shopping, real time knowledge of a device-wearer's identity allows financial particulars to be exchanged electronically with each item as selected and purchased. This eliminates the need to repeatedly enter passwords, security questions, or account information for each transaction or group of transactions. As a consequence, such an instantaneous purchasing system eliminates processes involved with so-called online shopping "carts" since there is no longer a need to cluster items for the purpose of entering account information (FIG. 8). Solely for customer convenience, groups of items purchased during an online shopping session can be treated as a cluster or summarized for the purchaser.

FIG. 8 illustrates a sequence of steps to make a CBID-authorized online purchase (without having to cluster items into an online "cart"). When an item to be purchased has been identified 2900, an eye signal 2910 can be executed to indicate a desire to purchase. Once item to be purchased is confirmed 2910, a CBID-based irisCode 2930 is compared 2950 with a data base 2940 of irisCodes belonging to authorized purchasers. If a match is determined 2950 (and sufficient funds, authorizations, etc. are available), then the purchasing transaction is performed 2960. The device wearer can then continue to shop for additional items 2900 and the purchasing process can be repeated any number of times.

In accordance with another embodiment, systems and methods are provided to enhance security and streamline shopping at so-called "brick and mortar" retail outlets. In this case, a camera mounted on the headwear device that views the environment of the device wearer can be used to identify objects that may be of interest for purchase. Identification can be based on bar codes or quick-response (i.e., QR) codes that are commonly attached to purchasable items. Such object identification uses image processing methods that are well known in the art.

Information about the item including a proposed purchase price can be generated by a processing unit associated with the retail outlet. This information can then be displayed on nearby monitors or on a head-mounted display associated with the device wearer. If the customer wishes to purchase a given item, a CBID-based transaction can be initiated by the customer. Such transactions can occur repeatedly throughout a store. A match between transported items and the transaction record would then allow items to be verifiably removed from the store by the customer. CBID-based retail purchases eliminate the need for check stands or tills. In many situations, the automated, real time display of information during the purchasing process also reduces the need for store clerks to assist potential customers.

A specific exemplary implementation of the CBID approach is "buy at the aisle" using eye-signal methods or processes referred to as "look to buy." In this case, the purchasing process consists of looking at an identification symbol (e.g., barcode, QR code) associated with the item or object identification of the item to be purchased, and executing a purchase activation sequence. Identification symbols can be physically affixed to the item or its packaging, or within signage associated with the items (for example, associated with bulk items within bins). The purchase activation sequence may include any combination of the following steps:

- Decode the identification symbol(s) or object recognition into an index that can be used to retrieve information about the item from a data base.
- Display (on an HMD or remote display device) information, including cost, about the item.
- Using eye signals and/or other means of interaction, optionally select and supply any additional information (e.g., specifications, availability of similar items, warranty information) desired by the purchaser.
- Optionally negotiate price.
- Indicate using an eye-signal sequence that a purchase is requested.
- Using CBID, ensure that the identified device user is authorized and has sufficient funds to make the purchase.
- Using secure telecommunications, execute the purchase process.
- Supply user feedback that a purchase has been made.
- Add the item to a tally or "virtual cart" of items that can be removed from the store.
- Make additional purchases using similar steps.
- Physically remove items from the store or virtually "tag" purchased items so that the actual items or their equivalents can be removed and/or delivered at some future time.
- Absent any cash registers, authorization for items being removed from the store can be verified by visual inspection or automatically (e.g., using RFID methods) to ensure that all physical items match those in the virtual purchasing cart.

This look-to-buy process has the following advantages:

- With detailed information available via display upon looking at an item, the need for interactions with store clerks can be greatly decreased, reducing or eliminating the need for store clerks.
- Since purchased information is stored and accessed within a central data base, key elements such as price can be adjusted instantaneously or even negotiated with a purchaser on an item-by-item basis.
- The retail infrastructure (i.e., hardware) for executing the purchasing process is minimal or non-existent (since the purchaser supplies the primary hardware). Similarly, there is no need for retail hardware maintenance or upgrades.
- There is no need for registers or check stands (including employees to run them) for "look-to-buy" purchases.
- Since purchases are made at the time an item is being specifically viewed by a purchaser, there is no ambiguity with items that might look or function similarly.
- Since all purchased items are identified individually, inventory control can be completely automated.
- "Look-to-buy" can also co-exist with traditional retail purchasing methods.

A more generalized example of "look to buy" is the "world is your store." In this case, object recognition is used to identify items for purchase that are simply viewed within the environment of the user. This can be based on objects specifically observed using eye signals and gaze tracking in the user's environment. As an example, if a dress is observed within a store-front or worn by another person and, using object recognition, one or more online sources for purchasing the dress can be identified, then an instantaneous purchase can be made based primarily on recognition of such a viewed object in the real world, portrayed on a sign, or seen on a display, for example, during a television broadcast.

A "world is your store" purchase would proceed in a manner similar to an online purchase. The major difference is that a specification of the object to be purchased is made based on object recognition, optionally augmented by viewing and registering any identifying tag (e.g., barcode, QR code) affixed to the object. This specification can also optionally be aided by interaction with the device user. For example, if a key portion of the object has not been observed, the user can view and interact with the objects in order to more fully and uniquely ascertain object identity. As an example, the purchase of a dress may involve the need to view the back side of a dress that was originally viewed from the front. The user can be advised to view the back side via an interactive process. An interactive dialogue, presenting the user with text, graphical information, directional information, or overlaid "augmented reality" information within the user's field of view, can facilitate a user's decision making process providing information interactively via eye signals, related to materials, capabilities, performance, quality, ratings, common usage by friends, price, shipping timing, etc. The dialogue may further be subject to substantially continuous or occasional user authentication to verify user identity, block tracking of user activities related to specific information, and more. A purchase may also involve access of a database of personal foundational information, related to identify or past behaviors, performance, preferences, and desires, such as the dress size of the device user. As during online purchases, authorization for the purchase(s) is based on CBID. The object(s) can be delivered to an address associated with the user.

Alternatively, delivery locations can also be specified based on automated recognition of places or individuals. For example, delivery can be to an address of an individual associated with a person being viewed by a device user. Delivery can also be specified based on recognition or specification (e.g., using GPS) of a place associated with the device wearer. Place recognition can be based on object recognition, for example, of a street sign or a building.

Other CBID-Enabled Secure Applications

In accordance with yet another embodiment, apparatus, systems, and methods are provided that control the exchange of secure data between the device wearer and a source of secure information, keeping meaningful information away from unwanted recipients. At the highest levels of sophistication to attempt to gain access to transmitted data, a potential mechanism of attack would be to attempt to mimic the two-way communication between a CBID system and a secure server. For this reason, communications between a CBID system and any remote computer are encrypted. Encryption keys can include a unique identification code assigned to each manufactured headwear system, the target irisCode, and be time/use-sensitive. As described above, encryption and de-encryption processes within CBID systems can also include hardware elements that are difficult to access, further increasing the security of transmitted data.

Examples of activities in which eye-signal control sequences use authentication include withdrawing money from an automated teller machine, making online purchases, documents needing electronic signatures that may optionally be signed with eye-signal sequences confirmed with identify, complying with identify verification requirements during any form of online, private, group or other testing, complying with performance requirements coupled with identity for various forms of employment such as professional driving, piloting or other transportation logging hours, confirming acknowledgement to informed consent provided orally or read by a user whereupon substantially continuous confirmation of identify occurs during saccadic activity during reading, confirming acknowledgement of any legally binding agreement, complying with identify verification requirements during collection of data for clinical trials or other medical research, treatment or testing programs, complying with identity verification requirements during any court-ordered activity requiring reading, check-ins, performance, or behavior for parole, probation, or by a prisoner within a jail or other form of incarceration, complying with identity verification requirements of government-monitored employees, agents, or military members who are monitored or tested, during performance of tasks including TSA (Transportation Security Administration) training or activities, combat or intelligence training activities, intelligence training or activities, census training or activities, confirming identify during handwriting including instances where a user uses eye-signals associated with the capture of the handwriting process, confirming identity during competitive or professional video game play involving eye-signal initiation or interaction, confirming identity during personal self-improvement programs including weight loss, sports training, overcoming phobias, public speaking, smoking cessation, rehabilitation programs, tagging identity during the eye-signal driven capture or recording of information for subsequent personal identity-confirmed access to the information, confirming identity to participate in information sharing associated with instances of mutual gaze where verifiably identifiable parties choose to share information.

In accordance with another embodiment, apparatus, systems, and methods are provided that replace or augment common password-based access to computing devices. Such a system may provide superior security compared to passwords and/or security questions. This arises as a result of the biometric nature of user identification (i.e., completely unique to an individual) as well as the ability to substantially continuously monitor the device wearer completely within a self-contained system. The system is designed to substantially continuously re-verify the identity of the device wearer approximately every second or at any desirable frequency, potentially including sampling rates rapid enough to re-verify during saccades, micro-saccades during eye-signal formations or other eye-activities including observing animate or inanimate entities and actions in a real or virtual environment. Unlike traditional password entry where a user can be replaced (overtly or inadvertently) following password entry, a CBID-based computer access system can halt secure operations immediately upon loss of positive device-wearer identification.

In accordance with yet another embodiment, apparatus, systems, and methods are provided that enhance the security and convenience of so-called "digital" or "electronic" signatures. Electronic signatures use various encryption techniques to indicate that 1) the source of a message or document is from a known sender, 2) a sender cannot later deny sending the message, and/or 3) the message was not altered in transit. The generation of a CBID-based digital signature provides a traceable method to verify a unique individual as the true source of a message. Examples of a digital signature include simple biometric authentication, any form of productive creation of the individual such as typing, writing, speaking, to produce an artifact, whereupon the gaze of the user may focus on the act of production with simultaneous substantially continuous biometric authentication.

Furthermore, substantially continuously verifying the identity of a device wearer allows continuous series of traceable documents to be generated. If such electronically signed documents are accepted as legally binding, the ability to rapidly exchange legal documents can enable many professional service providers to securely perform more of their services online. Examples of such service providers include financial advisors, insurance companies, lawyers, doctors involved in tele-medicine-based medical diagnostics and prescriptions, and real estate sales.

The communications link 155 can include wired Ethernet or wireless technologies such as communication protocols described in IEEE 802.11, Bluetooth, Zigbee, and mobile phone communication protocols such as LTE, GSM, CDMA, and GPRS. Routinely, a multitude of communications media and protocols might be involved in transmitting the wearer identification status and other data to a remote, secure processing unit. For example, a wireless (e.g., IEEE 802.11) communication might be used between the headwear device and a local router that, in turn, transmits packets over a so-called twisted-pair wired system that, in turn, transmits data to a central receiving processing unit (e.g., server system) located some distance away via fiber optic cable.

Some applications require verification of device wearer identification coupled with the unidirectional sourcing of secure (e.g., encrypted) information to an external processing unit. Entry of credit card or account information to make an online purchase is an exemplary application of this mode. Other applications may require the receipt of secure information exclusively at times when there is positive identification of the device wearer. The display of classified, read-only documents is an exemplary application of this mode. Other applications may require secure transmission in both directions when there is positive identification of the device wearer. The desire to protect both the questions asked and user responses to a scholastic exam is an exemplary application of this later mode.

As a further embodiment, systems and methods are provided to restrict the recipients of secure information to a limited number of identified individuals. For example, it may be desirable to distribute proprietary business documents to a group of identified individuals without document recording or storage possibilities on the part of the recipients. In this case, documents are sent in an encrypted fashion with de-encryption keys linked to the embedded device and irisCodes of device users and/or specific headwear systems. Document de-encryption occurs only within a limited number of receiving users/systems, when there is a positive CBID and also optionally when individual sight shields (see below) are in place.

As yet another embodiment, CBID can be used to verifiably document the performance of activities by an identified individual (or group of individuals). In this case, when reading and/or viewing a particular data set, video sequences captured by a scene camera pointed in the general direction of the field-of-view of the device wearer and/or audio sequences recorded by a microphone are recorded. Appended to these data are substantially continuous identification of the device wearer and time-stamps. Sequences can then be archived either remotely or within the headwear device for brief or extended periods (depending on need) as documentary evidence of the fact that an activity (e.g., reading, viewing) was performed and who performed it.

Examples of applications of such embodiments include verifiably documenting the identities of individuals during activities such as handling precious materials (e.g., diamonds), improving assembly line inspections (e.g., whether a defective item was removed), training processes (e.g., driver education), medical procedures (e.g., steps performed during surgeries), catastrophic events (e.g., the identity of a driver involved in a crash), or required inspections being completely performed by an appropriate individual (e.g., pre-flight airplane inspection by a pilot).

Other examples of applications include celebrities, professional athletes, expert video gamers, surgeons performing breakthrough operations, or other experts performing acts, with expert gaze captured with simultaneous scene camera recording or virtual display recording, with substantially continuous or interval authentication. The resulting "gaze-cast" (i.e., recording of external video with simultaneous overlay of a user's gaze in the form of a reticle or focus on relevant objects or areas) could then be authenticated and made available for sale, license or lease to individuals for entertainment, skill development, or other uses.

Degrees of Security

In other embodiments, the systems and methods can be adapted to a broad range of security levels including those in which there is need for extreme security. Extreme security levels could, for example, be employed during military applications, to gain access to high-value installations (e.g., nuclear stockpiles), or covert operations. In such extreme cases, the system must guard against sophisticated attempts at deceit such as placing an image of an iris or an extracted eye within the field-of-view of the iris-tracking camera. As an example of measures to counteract such attempts, physiological responses of the eye can be monitored.

Security protocols may require multiple individuals to engage with some action, or series of eye signals, to unlock, activate, or otherwise authenticate an event. Individuals wearing HMDs with CBID and eye-tracking would follow a security protocol involving performing authenticated parallel, serial, or interrelated actions to initiate the event.

Within these high security level embodiments, security-based measurements can be amalgamated into a single measure of confidence that the environment is secure. Such a Composite Security Index (CSI) can be used to assess whether secure information is to be displayed and/or deemed reliable. Reduction of the CSI could, for example, result in additional security questions or "dummy" information to further test device-user responses. If the CSI continues to drop, a variety of additional steps can be taken where, for example, the CBID platform could be requested by the remote, secure server to transmit video and/or audio relating to the environment of the device wearer. Components that contribute to the CSI can be selected to be narrow or broad, depending on a desired security level. CSI components can include one or more of:

a. the degree of match (including stringency criteria) of the identification coefficients associated with real-time iris scans;
b. the time elapsed since a high-stringency (i.e., on-axis) iris recognition;
c. the degree of confidence of pattern matching with regions around the eye during off-axis viewing;
d. ocular biometrics including the geometry, position, and movements of irises;
e. the time (and consistency) the device wearer spends looking in a direction associated with a display;
f. the presence, frequency, and velocity of eye blinks (i.e., brief periods when eyelids cover irises);
g. the output of sensors that determine the structural integrity of the headwear device;
h. measures of time lapses associated with a device wearer feedback responses compared to the time of display of information (e.g., questions) on a heads-up display or nearby display monitor;
i. changes in ambient lighting conditions, including whether pupillary responses are within normal ranges for such changes;
j. the timing of pupillary light reflexes evoked by the headwear system (by controlling illumination) at random intervals;
k. whether images viewed by the scene camera are generally consistent with an expected environment (e.g., viewing a display monitor versus apparent attempts to modify the headwear);
l. whether sounds monitored by a microphone are generally consistent with an expected environment;
m. the degree of match of coded video patterns that originate from a secure information source and displayed on a nearby monitor compared with images subsequently viewed by a scene camera; and/or
n. the entry of identification codes known only to the device wearer (and that may be time-sensitive).

One example of the use of the biometric items f and j above would be to assure that the eye-facing camera is indeed viewing a living eye of the user to be authenticated rather than a copy of the eye in the form of an imposter photograph, contact lens, or even a surgically removed eye from the owner (gruesome) as an attempt to compromise the CBID system.

In additional embodiments, eye-signal determination and authentication are performed within custom-built silicon (including application specific integrated circuits, ASICs) designed to restrict attackers by building identification and authentication methods into silicon as logic and function maintained within the lowest levels of a system architecture. This helps to prevent security attacks based on altering the programmable software of a device. Methods are also available to encrypt the firmware or hardware-encoded instructions within this low-level system architecture.

"Eyes Only" Viewing by an Identified Individual

In accordance with another embodiment, systems and methods are provided to restrict the recipient of secure information to a single, substantially continuously identified individual without the ability to record or store secure content for viewing by anyone else. For example, during the remote administration of on-line examinations, there is a need for the person being examined to be able to read exam questions. However, the integrity of the administration of the same (or similar) exam to others at a later date would be compromised if there were a method for another individual or a recording device (e.g., FIG. 1, camera 125) to view exam questions for the purpose of storing or transcribing questions with the intent of revealing exam content to others.

For such applications, the CBID system 100 can be implemented in conjunction with a head-mounted display. One or more sight shields are placed around the display to restrict the ability to view the display solely to the device wearer. A key aspect of this configuration is the fact that both substantially continuous user identification and the display of secure information are performed within the same device. Secure content is only displayed at times when a positive CBID is established making it impossible for another individual to view the secure content. Any object placed in the light path between the head-mounted display and the device wearer's eye breaks CBID.

In additional embodiments, a further level of security can be established by adding sensors to ensure that sight shields are in place and that components of the CBID system have not been tampered with. A relatively simple method to implement this is the addition of conductive pathways that run in series through all structural and electronic elements of the system. Tampering with, or removing any system component breaks electrical continuity that, in turn, can be sensed by the system. Such a compromise results in disabling positive CBID and/or an indication of compromise transmitted to the secure information server.

Equivalently, the structural integrity of the sight shield that surrounds a head-mounted display can be sensed by a wide range electronic components such as contact switches, push button switches, Hall effect switches, reflective photocells, and/or capacitive sensors. The sight shield can be constructed for dual-use, e.g., such that it is unobtrusive during non-secure applications allowing the head-mounted display to be used both in a see-through mode (i.e., with the shield removed) or in a high-security "individual viewer" mode (i.e., with the sight shield attached).

In another embodiment for extreme security applications, the head-mounted display can be manufactured with a highly tamper-resistant sight shield permanently in place. In another embodiment for extreme security applications, the head-mounted display could contain an added or integrated layer of electrochromic material whose opacity may be electronically controlled.

With further reference to FIG. 7, the remote processing unit 160 and the device used to display information 400 may be separate devices, located some distance from each other and requiring a secure (e.g., encrypted) communications link 155. Alternatively, the remote processing unit 160 and the display device 400 can be integrated into a single package. Examples of such devices with integrated processing and display capabilities are laptop computers, tablets, and mobile phones in which software can be coded to de-encrypt secure data only when there is a positive user identification.

Figure 9A:
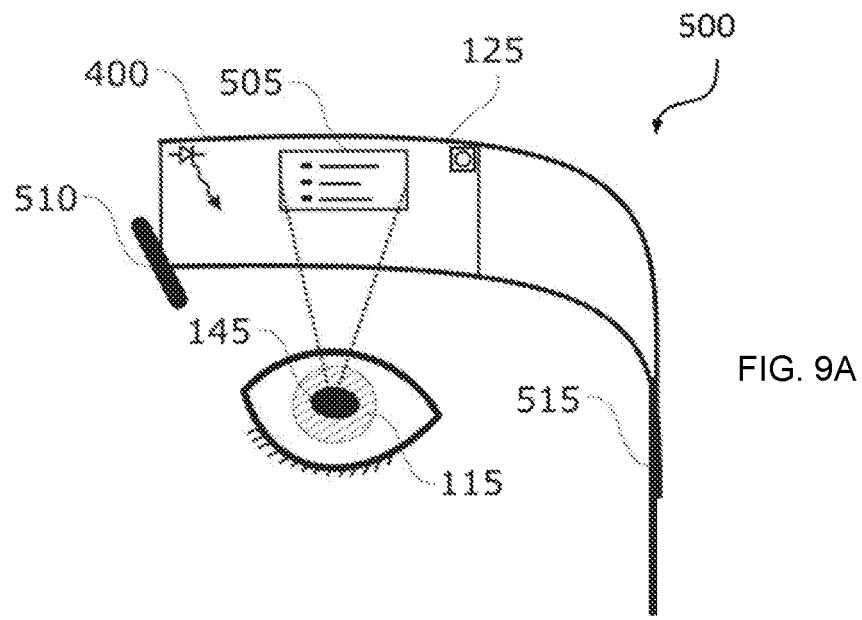
FIGS. 9A and 9B demonstrate the incorporation of a head-mounted display where
Figure 9B:
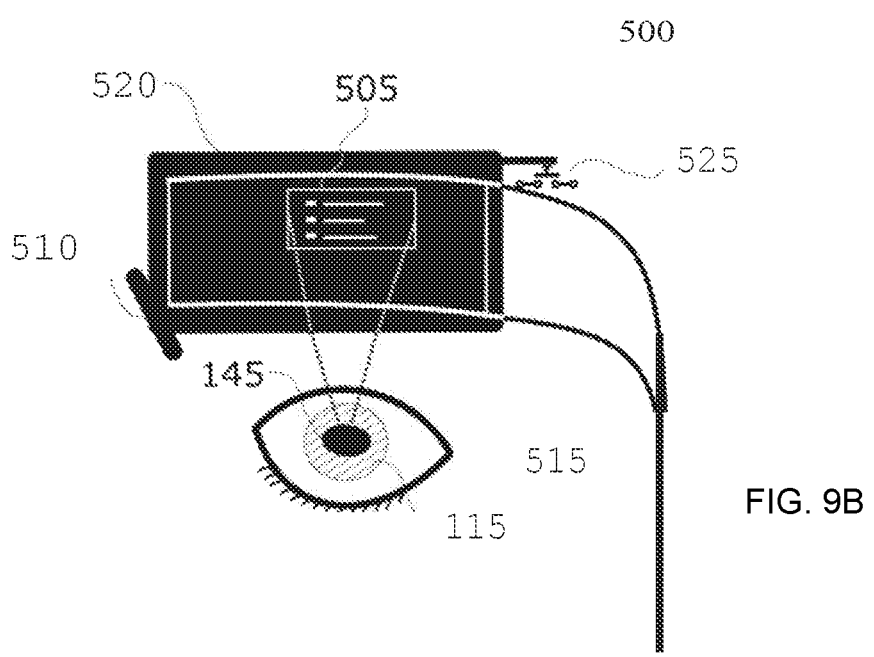

FIGS. 9A and 9B illustrate incorporation of an exemplary system into an eyewear device 500 that includes a head-mounted display 505 (also known by various other names such as a heads-up display, head-up display, HUD, retinal display, virtual reality glasses, augmented reality glasses, or smart glasses). As shown in FIG. 9A, the system includes a visible or near-infrared light source 400 that illuminates the region of an iris 115. A camera 125 is used to collect images of the iris 115 and features in the region of the eye. The display is arranged such that structured light (i.e., making up the display image) is reflected or projected onto the retina 52. The eyewear device includes a nose piece 510 and ear stem 515 that allows the system to be worn in a manner similar to a pair of typical eyeglasses. The CBID system 100 can be incorporated within an eyewear device or constructed as an accessory to a wearable computing or eyewear device.

In the case of FIG. 9A, the display 505 is arranged so that the device wearer can see past the projected image in order to view the environment. In FIG. 9B a sight shield 520 has been strategically placed such that no individual (or video system) can view the contents of the wearable display 505, except for the device wearer. As a consequence, the device wearer cannot see the surrounding environment with the same eye used to view the display 505. This setup prohibits the contents of the display 505 from being transcribed or recorded. Switch 525 and/or other sensing elements can be used to detect whether the sight shield 520 is in place and/or whether there have been attempts to defeat the concealment function of sight shields 520.

As an alternative to the "mechanical" sight shield just described, another exemplary embodiment utilizes electronic control of the transparency of a heads-up display (or other near-eye display device) in the region between where content is displayed (i.e., directed at the eye[s]) and the external environment. This acts as an "electronic shutter," controlling whether any person or recording device in the external environment can view the contents of a display. Electronic control of optical transparency or electrochromism can be implemented by a number of mechanisms including liquid crystal (i.e., the same principles used in liquid crystal display devices, LCDs), suspended particle devices (SPDs), nanocrystals, and other mechanisms often used within so-called "smart glass."

Similar to the removable mechanical shield just described, controlling the opacity of material(s) around a HUD prohibits the viewing of the content of a display by anyone other than the device wearer (see FIG. 9B). The primary advantage of electronic control is the ability of the device itself to control opacity, for example, blocking light transmission only at times when the device knows that secure information is being displayed. When not in a secure mode, the HUD can operate in a normal display mode where the user can view the real-world environment "beyond" the display. When in a secure (i.e., opaque) mode, the user cannot view the external world beyond the display and, more importantly, anyone in the external environment cannot view the contents of the display. This strategy can be particularly effective when the components that perform the display function and those that perform the blocking function are bonded to from a single structure that cannot be separated without destroying functionality.

As an additional mode of operation, the light-blocking or opaque mode can also be used to minimize interfering light from the external world in order to enhance the viewing of fine detail within the HUD. For example, when a photograph with fine, dark or low-contrast structures is displayed, these structures can be better viewed by the device wearer when interfering light (i.e., so-called "noise") from the environment is blocked. Electronic control of opacity allows this form of control automatically (i.e., depending on display content) or under user control.

As a further improvement to this embodiment, it is also possible to control opacity in specific regions of a HUD (versus the entire display area). In this case of spatially addressable control of opacity, it is possible for the device to block only one or more regions around specific secure information. For example, the region around an account number or traditional user password might be blocked from external view while allowing the user to continue to view the external world in areas other than the secure regions. Addressable spatial control of opacity is particularly well suited (and well-developed within the electronics industry) to LCD techniques (absent backlighting) where similar mechanisms are used within LCD projection devices.

Secure Personal Augmented Memory (PAM)

PAM is a system that utilizes eye tracking as a component to electronically enhance the medium to long-term memory of an identified device wearer. The PAM storage and retrieval of information can involve completely interchangeable information modalities (images, audio, voice, text, icon, etc.). The following are three overall steps for PAM:

1. Identify trackable objects that are important to an individual,
2. maintain a dynamic, historical archive of multi-modal, coupled data sets that include one or more identified trackable objects or attributes, and
3. identify and retrieve one or more data sets based on any mode of trackable object specification(s) or attribute(s).

The first step in PAM is to generate records of trackable objects that are "important" to an identified individual. These trackable objects can be in various modes including images, audio clips, video clips, text, icons, tags (e.g., price, manufacturer), location-based tagged objects on a map, etc. Conversion algorithms can be used to couple all of the different storage modes associated with each trackable object. For example, image recognition can be used to identify (e.g., conversion to text) objects within one or more images, voice recognition can be used to convert audio to text, text-to-voice can be used to convert text to audio, an icon can be associated with a specific object or group of objects, etc. Further, regions of interest indicated by gaze may be coupled with region of interest, with concurrent irisCode-based authentication, to reduce scene processing requirements, and to identify information only with associated user-identified objects.

Additional conversions of information can be applied when needed. For example, text or audio can be converted from one language to another. Image recognition can be extended to recognize specific objects. For example, algorithms to recognize a car can be made to further identify the specific car(s) of the device wearer. The price and physical characteristics (materials, design features, etc.) of an object can be identified and included in archival algorithms.

Individual users can generate any number of personalized, trackable objects. Most commonly, gaze tracking is used to identify objects being viewed in one's environment. Trackable image objects can also be identified from downloaded images or photographs (e.g., a street sign, the Eiffel Tower) where, once again, gaze tracking is used to identify objects under observation. Viewed objects, for example, can be identified and indexed based on image recognition. Other modalities (e.g., voice phrases) can be similarly classified (i.e., recognized) and indexed for future retrieval.

The second step of PAM involves dynamically adding to and maintaining an indexed, searchable historical archive of viewed objects along with their associated modalities that can include images, video, text, audio, etc. Additional information that is available at the time of record creation can also be stored to define additional object "attributes." This can include, for example, creation date and time, the user and/or device that generated the data set, geographic location, other identified individuals present, and so on.

As a final step, that can be repeated any number of times, the retrieval of indexed objects and their associated data can be based on, for example, viewing the object or a similar object. Criteria for information retrieval can include, for example, voice recognition, a segment of text, an icon that is associated with a particular object or class of objects, and so on. In additional embodiments, the information mode used to initially store the information does not need to match the mode used to retrieve information from the data archive.

For example, an image of a wallet could be used to identify a particular wallet at a GPS-based location. Data retrieval about the wallet could be in response to a verbal query such as: "Where is my wallet?" Subsequent information retrieved about the wallet could be in the form of a directional map (i.e., yet another data form) showing the location of the wallet relative to the device user's current position.

Retrieval of a particular, desired data set can be further isolated based on attributes of objects. As described above, attributes include supplementary information stored about an object. If attributes include location, date/time and cost, then the PAM system could respond to the query: "What is the least expensive shirt I viewed at a department store last Tuesday?"

If more than one data set matches retrieval criteria, the device user can either 1) allow further isolation based on additional input using any mode (viewing an object more closely, speaking words, specifying attributes, etc.), or 2) display thumbnail sketches of possible desired data sets, for example in reverse chronological order.

Another exemplary scenario that utilizes PAM is an ability to keep track of a newly viewed object such as a set of desk-drawer keys. A device user begins by viewing the keys and says "keys to my desk drawer." Whenever keys are viewed, a data set is stored that includes the place and time the keys are viewed. Later, when asked "Where are the keys to my desk?", the device responds with an image of where the keys are located and the time they were last seen.

As a further example of PAM in which the initial event that triggers PAM data storage is a "virtual object," one can view an individual in the form of an online image or video of that person. The person can be identified via online information or by stating a name when viewed, for example, "Jim Smith." One can then state any other desired attributes (age, occupation, etc.). Subsequent data sets are appended any time that individual is viewed in person or virtually. Later, a user can ask the question "When is the last time I saw Jim Smith?" Additionally, the device can identify Jim Smith whenever he is viewed by a scene camera.

Another example of the use of PAM begins by viewing an individual's car and saying "my car." When the car is parked, it is identified and a data set is created that includes recent images and the location of the car. Later, the device can respond to an icon on a screen that represents the answer to the question "Where is my car?"

If "too much information" becomes available, a device user may incorporate mechanisms to "forget" specified data sets and/or target objects. For example, the time of data set generation can be used to "forget" older items such as previous locations of a particular set of keys or one's car. Different criteria can be assigned to different trackable objects.

Both information storage and retrieval can be based on CBID. Data sets can exist on a wearable device, within a remote processor and/or distributed throughout cloud-based systems. Regardless of archival location, both the storage and retrieval of such information can be restricted to the CBID source of the PAM or a group of individuals that has been authorized by the CBID source of the PAM. Using CBID, the isolation of information to an individual can be restricted to that individual even when a single device is worn by multiple individuals.

As described in Systems and Methods for Biomechanically-based Eye Signals for Interacting with Real and Virtual Objects, incorporated by reference herein, eye signals (particularly those involving machine learning techniques) can be used to discern user intent. Using these methods, PAM-based information can be retrieved and "suggested" to a device wearer. This is a more abstract method of data retrieval (compared with addressing specific questions); however, the device can present archived data based on objects being viewed in the environment, queries being made, time of day, geo-location, words recognized, and the like. Furthermore, future "suggestions" can be based on modifications to the machine learning approaches based on whether the device wearer accepts or rejects "suggestions." Secure Human-to-Human(s) Communications (EyeConnect)

As a species, we are wired to communicate when meeting in person, whether in business or social contexts, upon finding a common relationship or shared area of interest. The process of determining if, when, how, and about what we should communicate is inherently inefficient and is frequently socially awkward. Further, human memory is imperfect, and we often encounter individuals for whom we have forgotten details of prior meetings, such as names or earlier meeting contexts. We all are sensitive to the social awkwardness that results from such encounters, and the degree that this impedes social discourse.

A process and application termed "EyeConnect" is a method for wearable computing users to increase, and make more efficient, different levels of interpersonal human connection while maintaining an explicitly-selected and well-controlled level of security and privacy. EyeConnect provides enhanced connection and communication between individuals within eyesight of one another, upon simple, mutual, eye contact. CBID-based EyeConnect provides for an individual's privacy by, for example, establishing connections between or among CBID registered individuals whose security and privacy levels have been established.

Examples of embodiments for this application include:
1. For people who know one another but have forgotten details of earlier encounters, EyeConnect instantly provides a forgotten name upon a first exchange of gaze, and seamlessly provides other contextually relevant information supporting an in-person encounter.
2. For people meeting for the first time at events, such as business, educational, political, social, or other venues; meaningful, relevant, and fruitful connections are left largely to chance and take time to develop. While there are systems and procedures today that attempt to automate or enhance connections between individuals; they are inefficient, inaccurate, imprecise, and sometimes awkward or disruptive to existing communication flow and social exchange. EyeConnect enables a secure level of efficiency and fluidity in establishing new connections in such gatherings.
3. For individuals meeting for the first time via personal (i.e., third party, CBID registered) introductions, EyeConnect expedites the exchange of contextually relevant information while enhancing the personal interchange with relevant common connections, experiences, interests, and more.
4. For a group of individuals gathering for a business or social exchange, EyeConnect facilitates the addition and inclusion of individuals within a dynamically formed group established for sharing information.

The range of the modality of information that may be exchanged following an EyeConnection also extends the value of EyeConnect. Not only is visual information shared instantly and discretely on a display (e.g., HUD), but aural information may be exchanged as an instant "phone call" that may be established between two individuals who exchange gaze at a distance. This can be useful for certain security applications, social situations (e.g., party, bar-scene), and other gatherings where people may spot one another and desire to chat from a distance.

In exemplary embodiments, EyeConnect performs these functions while respecting any ban on facial recognition or other object identification software. That said, the architecture associated with EyeConnect contemplates that eventual allowance of automated recognition of people within the field-of-view of wearable cameras. In fact, CBID can help to alleviate privacy issues by ensuring the identity of the individual acquiring camera images is associated with those images and/or used to inform anyone being viewed that such activities are taking place. CBID can allow or prohibit the storage and/or transfer of camera images only if the individual allows such images based on the identity of the image-taker. Furthermore, the association of the identified device user with any images taken should serve to deter the taking of inappropriate images. Repeat offenders should be identifiable based on their identities stored within image and video files.

The EyeConnect application also supports the geo-location and provision for information exchange, one-way or two-way, of proximity-relevant individuals. In another exemplary embodiment, two users of EyeConnect gaze at one another for a moment to determine whether they should be, or already are, connected. Their mutual gaze at one another's eyes for an activation, occurring at the same time and geo-location, generates a "Spark." If the two users are not already EyeConnected and have sufficient "Commonality," the Spark "Ignites," and the users receive an instant "Connect Alert" with contextually appropriate information to support a personal, introductory conversation.

With one's eyes, interacting instantly with a display following the Connect Alert, a pair of users who have Connected, can browse select information regarding one another. This may occur prior to, during, or following engaging in physical conversation with one another. EyeConnect also facilitates sharing and transfer of additional information that either user decides to provide, beyond that initially shared via a Connection Alert.

Supporting EyeConnect are two key components: 1) a user's "Persona" and 2) a user's "Event Profiles." A user's Persona may be entered manually, auto-filled with information from linked accounts such as Facebook or LinkedIn, and/or may draw upon other information from a user's online footprint. Persona data include such information as name, goals, interests, profession, employer, family members, colleagues, contacts, hobbies, hometown, favorite sports team, favorite music, and more.

A user's Event Profiles contain information to facilitate both matching and sharing. A user establishes Event Profiles beginning with a set of standardized Event Templates, with fields populated with data from a user's Persona. Event Profiles may be populated automatically or manually. Following a "Spark" (i.e., contemporaneous, local, exchanged gaze), EyeConnect compares data from two users' active Event Profiles to determine whether to "Ignite" and produce a Connection Alert. Thresholds based on commonality within selected topics, connection interests and/or other factors are used to determine when Ignition should occur. In addition to providing information for assessing matching, each Event Profile also specifies precisely what information should be shared in a Connection Alert. As such, Event Profiles are used both to determine whether Ignition should occur, and if so, what introductory information should be automatically shared.

A set of standardized Event Profile templates can be available for events such as a business conference, party, bar-scene, classroom, office place, vacation, street-scene, sporting event, beach-scene, church, sales meeting, and more. Each template may be custom configured by a user or group of users, and new event templates may be created and shared within an EyeConnect user community.

A device user can also maintain any number of customized profiles to meet a wide range of day-to-day conditions. For example, a user might maintain profiles to cover the following situations: general business, multiple specific business conferences and other events, educational events, hobby gatherings, social interactions, church, etc. By maintain different profiles for different situations, the dissemination of information can be controlled in a careful and pre-planned fashion to groups such as family, friends, close friends, business associates, close business associates, teachers, individuals with shared interests, and the like.

Transitioning from one situation to another can be: 1) explicit, where the user informs the device that a situation has changed, or 2) implicit, where the device recognizes different situations. Recognition of situational conditions can be based on the consideration of a number of factors including face recognition, (familiar) objects recognition (e.g., objects within a home), recognition of characteristic activities (e.g., at a sporting event, playing golf), geo-location (e.g., airport, hospital), signage, scheduled events on a user's calendar, other activities that have recently been performed by the device (e.g. conference or hotel registration), the presence of music (e.g., at a concert), and the like. In some situations, more than one profile may be in effect at one time (e.g., hobby and social activities being undertaken simultaneously). In this case, exchange can be based on permissions within any applicable profile. Exchange can also be made "conditional" based on other factors such as the degree of overlap in interests and/or specific conditions (e.g., within specific time frame, living in the same city).

At all levels of interaction, the exchange of information is based on the established identity of the participants and their pre-established level of privacy for the exchange of information. It would be impossible using CBID to, for example, have an intruder exchange or pick up a device that has been temporarily set down and begin to transfer EyeConnect private, device-owner information to a third party.

As another embodiment, two users who have previously met via EyeConnect, or who have connected with one another as mutual acquaintances within an EyeConnect's network, never again will face the embarrassment of lack of name recall. EyeConnect effectively provides an "invisible name-tag" and more. Two former acquaintances are able to instantly re-acquaint with the benefit of both name recall and full context of previous encounters. This includes reminders of previous meeting events, locations, times, shared information, and even supplementary information logged at or subsequent to previous encounters.

Further, EyeConnect provides the results of an instant online search for a Connected individual with immediate presentation of contextually relevant information. Both users in such a meeting are on level ground, and are relieved at innocuous and fluid memory enhancement provided by EyeConnect.

In further embodiments, overlapping interests within two or more EyeConnected individuals can be identified and displayed. Such interests can be placed in the historical context of previous meetings and exchanges of information on identified topics.

As a scenario to help illustrate embodiments, device user 1 (U1) encounters user 2 (U2) at a conference. They have never met, but both formerly worked at the same company and know many people in common. They have loaded their Business-Conference Event Profile for EyeConnect prior to the conference. This Event Profile contains each of their personal goals for attending the conference, their job histories, names of close colleagues from former companies, as well as other information they view as relevant to sparking EyeConnections. They also each configured their Business-Conference Event Profile to contain their favorite hobbies, the names of their wives and children, the school their children attend, and other personal data that may yield a connection on a more personal level. U1 has configured his/her Business-Conference Event Template to allow information sharing only regarding his professional background. U2's configuration allows sharing of all matching items.

While standing in a lunch line with EyeConnect active, they look at one another for a brief second to see if they should Connect. Each of their wearable devices displays a Connect Alert. Both read that they previously overlapped at a company, and U1 sees that U2 has children that attend the same school as his children. They also each see what the other's goals are for the conference and eye-scroll through other information selectively shared from their Profile. They then engage in conversation, immediately sharing their common areas of interest and elaborating on their goals for the conference. They swap credentials via the EyeConnect application and arrange a time to meet. Within minutes they wrap up their initial connection and move on to EyeConnect with other attendees.

Extending the scenario to illustrate other embodiments, during the meeting with U2, U1 also briefly EyeConnected with user 3 (U3). Later, U1 spots U3 at a party and thinks she/he looks familiar. U3 and U1 gaze at one another, generate a Spark, and EyeConnect notes that the U3 and U1 have already EyeConnected. The Party Event Profile is overridden by an Acquaintance Profile and an EyeKnowU Alert is generated for each of U3 and U1. U1 sees U3's name, a reference to another event where they met, and the information that U3 had shared at the event. U1 notes that there is Ignition, with a new match, for the current Party Event and chooses, via eye-signaling, to look at the Connection Alert for the Party. U1 sees some additional information provided by U3 for a party context and notes that U3 is also a pilot. U3 notes the same. They greet one another, acknowledge their previous meeting, and kick off a discussion regarding their passion for flying.

The EyeConnect service can selectively apply facial recognition to images of other individuals. Steps can be taken to avoid surreptitiously providing information about people within the field of view, particularly in circumstances where there is a ban on this functionality. When two people gaze at one another simultaneously, EyeConnect's eye-tracking software works in conjunction with a wearable scene camera to define a Spark event drawing from information that a user has allowed to be used. For example, in the above example, eye-tracking software within U1's EyeConnect application notes that U1 is gazing at another person's eyes. U2's EyeConnect software simultaneously notes that U2 is gazing at another person's eyes. Each takes a temporary, disposable photograph of the face of person being gazed at, so U2 capture's U1's face and U1 captures U2's face. Facial features may be extracted from each face for matching, and the image is retained for user confirmation.

Each image is time- and geo-location-stamped, and sent to a server for Spark-testing. When U2's image matches U1's time, face and location (using a pre-stored image of U1's face, supplied to EyeConnect by U1 upon registering for EyeConnect), and U1's image matches U2's time, face and location, the server declares a "Spark" between U1 and U2. They are each presented with the original image, for confirmation, as a part of the Connect Alert. Optionally, each user's Persona image may also be shared with the soliciting user.

The server then discards the temporary captured images and extracted facial features, respecting privacy of the individuals, and screens for a "threshold of commonality" using their Event Profile information. Assuming the connection threshold is crossed, the server declares a "Connection"

between them, and mutual Connection Alerts are generated, sharing information as specified by their Event Profiles.

Exception Handling and Additional Features

Power consumption and available bandwidth are ubiquitous issues for all wearable devices. When EyeConnect is enabled, gaze-tracking can be performed, for example, at one second or other desired intervals, within a defined user field-of-view (FOV). For each captured gaze, the gaze point is mapped onto a limited area-of-interest (AOI) within the wearable camera's FOV. The EyeConnect application looks for a face within this AOI. If a face is found and the face appears to be wearing a headwear device, then the image of the face can be sent to the EyeConnect cloud to determine whether that user is engaged in a mutual gaze. There are many optimization opportunities for acceptable device latency while maintaining reduced power consumption including eye-initiated Connect requests, pushed or pulled geo-location data delivered to an active EyeConnect user regarding proximity to other active EyeConnect users, and methods for optimizing image processing for faces wearing headwear devices.

As a further exemplary embodiment, EyeConnect is designed to operate with tolerance to low-accuracy, or even temporarily inoperable eye-tracking, within a large FOV on a wearable computer, with graceful degradation of performance resulting from reduced accuracy or loss of identity and/or tracking. The gaze tracking technology helps to select a single face among an image. The selection of a pair of users is also screened by time- and geolocation-stamping.

As outlined above, EyeConnect extracts an AOI based upon a user's gaze. The size of the AOI is determined by the estimated gaze accuracy. For instance, a ±10 degree gaze point accuracy might call for a 20+ degree radius AOI for image analysis. If the system experiences a total loss of gaze-tracking, the AOI would become the entire FOV of the scene camera. This would require more processing power to identify a mutually-gazing device-wearing face.

Screening and recognition of mutual-gazers can also be enhanced using computer vision (CV) methods that screen visually for device-wearing individuals. Devices can assist such CV methods through controlled visual information, such as one or more external facing infrared (IR) light-emitting diode(s) (LED) and/or specific recognizable patterns (e.g., visible or infrared) affixed to devices and/or users. IR LEDs can be modulated to avoid conflicting with IR-based eye tracking or other devices, or to identify a specific individual (by encoding specific modulation patterns). Other forms of modulated/distinguishing interchange of information can also be included.

As a further exemplary embodiment, consider the problem of potential misconnections that, though rare, could occur among several simultaneous, co-located EyeConnect users. Consider four device-wearing, EyeConnect-active users. U1 and U2 are sitting side-by-side, and U3 and U4 are sitting next to one another. U1 and U3 engage gaze, desiring to connect, and U2 and U4 also gaze at one another. If accuracy is imprecise, the system may think that U1 and U4 are gazing at one another, and U2 and U3 are gazing at one another. In this case, the system could provide any of several mechanisms to address this situation.

1. EyeConnect could note the potential for error and alert users.
2. EyeConnect could make its best guess and ask for confirmation, with easy correction available.
3. EyeConnect could request that each user choose among potential target individuals.

Recall that a snapshot taken of each user's face, once two users look at one another, is temporarily maintained to provide information to verify that two users are actually looking at each other. As implied above, the availability and appropriately timed presentation of this snapshot could provide an assurance for intended connections. The snapshot, or an existing image from the target's persona might be used for this purpose.

Variants of this example, where accuracy directs gaze farther away from even a single additional device-wearing EyeConnect user also may be addressed with a combination of more processing of a larger AOI coupled with appropriate information within the user interface. The incidence of potential errors, whether false-positives or false-negatives, increases with reduced accuracy eye-tracking and more EyeConnect users.

The following are additional optional exemplary features, any one or more of which can be included within EyeConnect systems:

1. EyeTalk—EyeConnect supporting a "voice connection"
2. Geo-located meta information—quick visually-presented information regarding: a) proximity acquaintances (known nearby people), b) proximity to potential EyeConnect users who are open to connecting (including guidance on where to look for them, why one should connect, etc.), and c) facilitated connections including lists of name reminders and pictures.
3. EyeNotes—notes on acquaintances that can be voice-transcribed, added as text, or based on screened access to Facebook, LinkedIn, etc.
4. Pre-Event Connections—as soon as users load Event Profiles and specify a time and place for an event where ConnectionAlerts may also be allowed.
5. Operation without Eye-signaling—general information about people based upon any form of identification, including Geo-location
6. UniSpark—eye-signal selection of other device-wearing individuals who have opted-in to allow matching and/or access to their Persona or Event information. For example, user 1 (U1) may gaze at user 2 (U2), another device-wearing individual who has opted in, via EyeConnect, to allow matching (one-way or two-way sharing) with a soliciting user. If a match occurs, U1 receives a ConnectionAlert with information about U2. U2 may optionally also receive a ConnectionAlert. U2 enables a Gazeless Connection Alert if EyeConnect is active for U2 and U2 has enabled non-gaze Alerts. If U2 is not running EyeConnect, U2 may receive a subsequent report of any Connections established with logged Connection Alert information from soliciting, matching users.
7. AnySpot—At locations, times and/or conditions where facial recognition is allowed, a device user may look at any face, whether the user uses wearable computing/EyeConnect or not, to obtain information. Using facial recognition, the device user receives any available information from any source, including their own contacts, regarding each individual at whom they gaze. EyeConnect provides display-based information, including AR presentation of information, supporting one-way information access (including recall, notes, etc.) and two-way information exchange.

The following is a list of additional exemplary connection configurations along with distinctive elements within each configuration. All implementations can be CBID-based and make accommodations for contact lenses, phones, and/or external cameras as well as eye-tracking, and displays for non-augmented reality/virtual reality, augmented reality, and virtual reality situations.

Gaze-Assisted Object Identification Optionally Assisted by Dialogue

Computer vision techniques to identify objects from a static scene or a rapidly changing series of images typically require some combination of substantial processing power, high bandwidth transmission of image data for non-local processing, high-resolution digital imagery, non-real-time processing, and other elements non-conducive to meaningful, general-purpose, instant object identification on a wearable, camera-equipped computer constrained by limited processing power, camera resolution, transmission speed, battery power and/or memory. Recent advances in eye-tracking technology enable the deployment of low-power, low-processing, self-contained wearable technology. The technology is efficient, focused, and discrete (i.e., private). The addition of human cognitive selection to specify an area of interest within a scene, or across a rapidly changing series of images, can dramatically reduce the resources required to visually identify an object in different contexts. Further, a visual feedback system is desirable that can enable an intelligent interchange during a computer vision search, which fluidly, intuitively, and rapidly merges human cognitive processing with machine processing to enable a wearable computer, with limited resources, to identify objects across contexts.

A "dialogue" between software and a user can be used to confirm or contribute to object identification. Once confirmed, objects can be used for EyeConnections and/or information sharing.

Structured Exchange of Personal Information

Persona-based matching to allow and facilitate selective sharing of information can include: using a wearable computer system with or without a display, in real-time, proximity (geo-location) and event-based profiles for specific sharing. Other indications of willingness to share include mutual gaze, one way gaze, hand shake, and/or other signals (e.g., body language) or gestures. Systems can involve local or remote information management, screening, and/or transfer of user-specified information. Systems can also involve community sharing, refinement, and rating of Event Profile attributes that can include specific screening criteria and sharing criteria.

Event-Based Selection of Information to Determine Relevance

Event filters can be used to determine the relevance of personal/interaction relationships. These can include: user-loadable, calendar-loadable, filters produced by algorithms, mutually or cooperatively selected, and/or dynamically-loaded criteria. Dynamic filters can be loaded prior to, during, or following and event.

Private Determination of Engaged Parties Through Simultaneous Gaze

A system can compare images of individuals looking towards one another using wearable devices. The system can use event profiles, time stamps, and/or geo-location; and avoid the facial recognition software (except temporary or a priori images). This system can include the identification of users "wearing devices" as another screening method. Methods for this include: computer vision to distinguish wearable devices, a user pursuing/engaged in mutual gaze, IR, and/or other signaling protocols between devices or when another device is seen with EyeConnect active.

Mutual Gaze-Based Protocol for Event Initiation

A number of different criteria and heuristics can be used to initiate and expand (or conversely, maintain the privacy of) gaze-based events. Primary among these is the detection of simultaneous eye contact to initiate an event. Other criteria include the presence of a: wearable system, camera based conference system, 1:1 gaze, 1:n gaze, n:m gaze (group initiation of an event for sharing information), 1:1 private sharing within a larger group, 1:n private sharing within a larger group of participants, and/or threshold time to define eye-contact. In addition, criteria can depend on whether other actions are involved including: additional screening to qualify for an event, whether an event can cause control of some type (e.g., event registration, altering of information), whether the event can result in the transfer of information uni-directionally from one party to another or bi-directionally between parties and or whether the action is in real-time or delayed.

Common Gaze Contribution of Data for Simultaneous Location and Mapping

User gaze can be coordinated and directed among users with guidance and feedback from wearable displays. Displays can be in-line or peripheral to the device. For example, the gaze of a number of users can be directed to a stadium screen. Confirmation and/or analysis that focus is in a particular direction can be determined from multiple geo-located users.

Common Gaze Initiation of Multi-Modal Information Exchange

EyeConnections can include other modalities of information exchange including: visual information exchange (e.g., video or images) or real-time voice information exchange.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

OTHER PUBLICATIONS

So as to reduce the complexity and length of the Detailed Specification, and to fully establish the state of the art in certain areas of technology, Applicant(s) herein expressly incorporate(s) by reference all of the following materials. The incorporated materials are not necessarily "prior art" and Applicant(s) expressly reserve(s) the right to swear behind any of the incorporated materials.

Daugman J. (1993). High confidence visual recognition of persons by a test of statistical independence. *IEEE Trans. Pattern Analysis and Machine Intelligence*. 15(11): 1148-1161.

Daugman J. (2007). New methods in iris recognition. *IEEE Trans. Systems, Man, Cybernetics B* 37(5): 1167-1175.

Daugman J. and C. Downing (2001). Epigenetic randomness, complexity, and singularity of human iris patterns. *Proceedings of the Royal Society*, B, 268, *Biological Sciences:* 1737-1740.

Rakvic, R. N., R. P. Broussard, D. Etter, L. Kennell, and J. Matey (2009). Iris matching with configurable hardware. Proc. SPIE 7244: 724402-724402-10.

Applicant(s) believe(s) that the material incorporated by reference herein is "non-essential" in accordance with 37 CFR 1.57, because it is referred to for purposes of indicating the background of the systems and methods herein. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

It will be appreciated that elements or components shown with any embodiment herein are exemplary for the specific embodiment and may be used on or in combination with other embodiments disclosed herein.

Having described and illustrated the principles of the present invention in exemplary embodiments thereof, it should be apparent that the present invention may be modified in arrangement and detail without departing from such principles. Claim is made to all modifications and variation coming within the scope of the following claims.

We claim:

1. A method for providing substantially continuous biometric identification of a user, comprising:
    providing a headgear comprising a plurality of cameras oriented towards an eye of the user from different angles;
    analyzing one or more images from the cameras to identify an iris of the eye;
    selecting images from multiple cameras from the plurality of cameras providing desired views of the iris;
    creating a composite irisCode from the selected images;
    identifying the user based at least in part on the composite irisCode; and
    authorizing the user to perform one or more actions upon confirming the user's identity,
    wherein the multiple cameras are selected because a large enough portion of the iris is identifiable from the images to satisfy a minimum stringency threshold needed to identify the user, and
    wherein the selected images provide images of the iris from multiple angles, and wherein creating the composite irisCode comprises selecting portions of the iris from the selected images and combining the portions of the iris into a composite image of the iris,
    the method further comprising, after authorizing the user to perform one or more actions:
        a) analyzing another set of images from the multiple cameras to identify features of the iris; and
        b) confirming the identity of the user based at least in part on the features of the iris from the another set of images,
    wherein steps a) and b) are repeated when a predetermined action is selected by the user that requires confirmation of identity before performing the predetermined action.

2. The method of claim 1, wherein a first camera is selected based at least in part on a shape of the iris identified in images from the first camera.

3. The method of claim 2, wherein the first camera is selected based at least in part on the shape of the iris identified in images from the first camera being closer to substantially circular the shape of the iris identified in images from other cameras.

4. The method of claim 1, wherein the multiple cameras are selected based at least in part on lighting contrast in images from the multiple cameras.

5. The method of claim 1, wherein steps a) and b) are repeated substantially continuously.

6. The method of claim 1, wherein steps a) and b) are repeated periodically.

7. The method of claim 1, wherein creating the composite irisCode further comprises rotating one or more of the selected images to align the images of the iris in the selected images into a common axis before combining the portions of the iris.

8. The method of claim 1, further comprising, after authorizing the user to perform one or more actions:
    analyzing additional images from the cameras;
    creating a new composite irisCode from the additional images; and
    confirming the identity of the user based at least in part on the new composite irisCode.

* * * * *